United States Patent
Aggarwal et al.

(10) Patent No.: US 7,984,085 B1
(45) Date of Patent: Jul. 19, 2011

(54) RATE OF CHANGE OF DATA USING ON-THE-FLY ACCOUNTING

(75) Inventors: Himanshu Aggarwal, Cary, NC (US); Andy C. Kahn, San Francisco, CA (US); Eric C. Hamilton, Durham, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 618 days.

(21) Appl. No.: 10/973,229

(22) Filed: Oct. 25, 2004

(51) Int. Cl.
*G06F 17/30* (2006.01)
*G06F 12/00* (2006.01)

(52) U.S. Cl. ................... 707/825; 707/821; 707/822

(58) Field of Classification Search ............... None
See application file for complete search history.

(56) References Cited

U.S. PATENT DOCUMENTS

| | | | |
|---|---|---|---|
| 4,570,217 A | 2/1986 | Allen et al. | |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A * | 10/1998 | Hitz et al. | 707/203 |
| 5,931,918 A | 8/1999 | Row et al. | |
| 5,941,972 A | 8/1999 | Hoese et al. | |
| 5,963,962 A * | 10/1999 | Hitz et al. | 707/202 |
| 6,038,570 A | 3/2000 | Hitz et al. | |
| 6,061,770 A * | 5/2000 | Franklin | 711/162 |
| 6,065,037 A | 5/2000 | Hitz et al. | |
| 6,289,356 B1 * | 9/2001 | Hitz et al. | 707/201 |
| 6,301,609 B1 | 10/2001 | Aravamudan et al. | |
| 6,425,035 B2 | 7/2002 | Hoese et al. | |
| 6,829,617 B2 | 12/2004 | Sawdon et al. | |
| 6,895,413 B2 | 5/2005 | Edwards | |
| 6,934,822 B2 | 8/2005 | Armangau et al. | |
| 6,959,310 B2 * | 10/2005 | Eshel et al. | 707/200 |
| 6,993,539 B2 | 1/2006 | Federwisch et al. | |
| 7,100,089 B1 * | 8/2006 | Phelps | 714/42 |
| 2002/0083037 A1 * | 6/2002 | Lewis et al. | 707/1 |
| 2002/0091670 A1 | 7/2002 | Hitz et al. | |
| 2002/0129214 A1 * | 9/2002 | Sarkar | 711/162 |
| 2003/0158861 A1 * | 8/2003 | Sawdon et al. | 707/200 |

(Continued)

FOREIGN PATENT DOCUMENTS

EP 1345456 9/2003

(Continued)

OTHER PUBLICATIONS

"Set Theory" (dated 2002), website: http://www.rwc.uc.edu/koehler/comath/26.html.*

(Continued)

*Primary Examiner* — Tim T. Vo
*Assistant Examiner* — Garrett Smith
(74) *Attorney, Agent, or Firm* — Blakely, Sokoloff, Taylor & Zafman LLP

(57) ABSTRACT

A storage system, such as a file server, creates persistent consistency point images (PCPI) or "snapshots" that are point-in-time representations of the storage system. The storage system uses persistent consistency point images to backup or mirror data. Using data already found in the data block maps associated with these PCPI, the rate of change of data between persistent consistency point images can be determined.

8 Claims, 18 Drawing Sheets

U.S. PATENT DOCUMENTS

| | | | |
|---|---|---|---|
| 2003/0182313 A1* | 9/2003 | Federwisch et al. | 707/200 |
| 2003/0195903 A1* | 10/2003 | Manley et al. | 707/201 |
| 2004/0088301 A1* | 5/2004 | Mahalingam et al. | 707/100 |
| 2004/0093474 A1* | 5/2004 | Lin et al. | 711/162 |
| 2004/0205112 A1 | 10/2004 | Margolus | |
| 2004/0267836 A1* | 12/2004 | Armangau et al. | 707/203 |
| 2005/0066095 A1* | 3/2005 | Mullick et al. | 710/200 |

FOREIGN PATENT DOCUMENTS

| | | |
|---|---|---|
| WO | WO 01/50722 | 7/2001 |
| WO | WO 01/98936 | 12/2001 |

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14th VLDB Conference, LA, CA, 1988.

Chaudhuri, Surajit, et al., *Self-Tuning Technology in Microsoft SQL Server*, Data Engineering Journal 22, Feb. 1999, pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage*, Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242, 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062, 1988.

Howard, John, H. et al., *Scale and Performance in a Distributed File System*, ACM Trans. Computer System, 6(1), Feb. 1988, pp. 51-81.

Kazar, Michael Leon, *Synchronization and Caching Issues in the Andrew File System*, Carnegie Mellon University, CMU-ITC-88-063, 1988, 12 pages.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999, pp. 33-40.

Kent, Jack et al., *Optimizing Shadow Recovery Algorithms*, IEEE Transactions on Software Engineering, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lome, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D,T al., *A Case for Redundant Arrays of Inexpensive Disks (RAID)*, SIGMOD International Conference on Management of Data, Chicago, IL, USA, Jun. 1-3, 1988, SIGMOD Record (17)3: 109-16, Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299, 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA, Jun. 1990.

Rosenblum, Mendel, et al., *The Design and Implementation of a Log-Structured File System*, Jul. 24, 1991, pp. 1-15.

Rosenblum, Mendel, *The Design and Implementation of a Log-Structured File System*, 1992, pp. 1-93.

Schiefer, Berni, et al., *DB2 Universal Database Performance Tuning*, Data Engineering Journal 22, Feb. 1999, pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, Tuning Time Series Queries in Finance: Case Studies and Recommendations, Data Engineering Journal 22, Feb. 1999, pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999, pp. 28-32.

Weikum, Gerhard, et al., *Towards Self-Tuning Memory Management for Data Servers*, Data Engineering Journal 22, Feb. 1999, pp. 3-11.

West, Michael, et al., *The ITC Distributed File System: Prototype and Experience*, Carnegie-Mellon University, Technical Report CMU-ITC-040, Mar. 1985.

Zayas, Edward R., *AFS-3 Programmer's Reference: Architectural Overview*, Transarc Corporation, Pittsburgh, PA, 1.0 edition 1991.

\* cited by examiner

RATE OF CHANGE OF DATA USING ON-THE-FLY ACCOUNTING

FIELD OF THE INVENTION

At least one embodiment of the present invention pertains to storage systems, and more particularly, to a method and system for determining rate of change of data in a storage system.

PRIOR ART AND RELATED ART

Various forms of storage systems using redundant storage devices and techniques have been developed to help keep digital data safe. From creating a backup, to using simple RAIDs (redundant array of inexpensive disks), to using more dedicated solutions such as storage area networks (SAN) and network attached storage (NAS), users have attempted to make sure that their data is safe and easily accessible.

While these solutions help users to ensure that their data is safe and accessible, each backup system has a cost associated with it. For disk removable media backup such as CDROM or DVD, that cost is the time to write a disk and the cost of the disk itself. For SANs and NAS solutions that cost is the use of memory space (typically harddrive space) to maintain copies of data and the costs of the devices themselves (SANs and NASs are expensive). The copies could be older data such that a restoration to a previous point in time is possible or they could be redundant copies of current data on several disks (with the idea that at least one of those disks should always work).

A storage system can be deployed within a storage area network (SAN) or a network attached storage (NAS) environment, for example. When used within a NAS environment, the storage system may be embodied as a file server (sometimes called a "filer") including an operating system that implements a file system to logically organize the information as a hierarchical structure of directories and files on disks or other memory devices. Each "on-disk" file may be implemented as a set of data structures configured to store information. A directory may be implemented as a specially formatted file in which information about other files and directories are stored.

The file server, or "filer", may be further configured to operate according to a client/server model of information delivery to thereby allow many client systems (clients) to access shared resources, such as files, stored on the filer. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics.

One way to represent the data of a storage system is to use persistent consistency point images (PCPI) or "snapshots" as point-in-time representations of the storage system. More specifically these snapshots are representations of the active file system of the storage system. Some storage systems use snapshots to facilitate mirroring or other backup operations. These snapshots can be stored on a storage device or in other persistent memory and having a name or other identifier that distinguishes it from other snapshots taken at other points in time. Storage operating systems implementing snapshots typically provide a command to enable a user or administrator to obtain information about snapshot consumption of available disk space by determining the percentage of space utilized by snapshots associated with the storage system. This can take a significant amount of time and processing power to compute the file system usage of each of the snapshots.

While knowing how much space is consumed is important, it is almost as important to know when that space will be consumed. Unfortunately in most systems data storage is not performed at a consistent and predictable rate. What is needed now to further improve the efficiency of storage systems is a way to determine how long the finite amount of storage available in a storage system will last given current trends of storage over a period of time.

SUMMARY OF INVENTION

The present invention includes a method which includes creating a plurality of snapshots and determining the rate of change of data between the snapshots. The method further includes determining the number of blocks in an oldest owner array associated with at least two snapshots and determining the difference in creation between two of the snapshots.

The invention further includes a system and apparatus that can perform such a method.

Other aspects of the invention will be apparent from the accompanying figures and from the detailed description which follows.

DETAILED DESCRIPTION

A method and apparatus for determining the rate of change of storage space consumption in a storage system, by using on-the-fly accounting, are described below. In the following description, numerous specific details are set forth in order to provide a thorough understanding of the present invention. It will be apparent to one skilled in the art, that the present invention may be practiced without these specific details. In other instances, well-known storage system designs and implementations are not described in detail in order to facilitate description.

As described in greater detail below, by using data stored by on-the-fly accounting including creating a plurality of snapshots, the rate of change of data between snapshots can be determined. Using an oldest owner array for each snapshot that is updated on the fly, the number of blocks associated with each snapshot can quickly be determined. As the creation time of each snapshot is also already stored, the rate of change of data can quickly be calculated by summing up the number of blocks that have changed between snapshots and dividing by the difference in creation between two of the snapshots.

Figure 1:
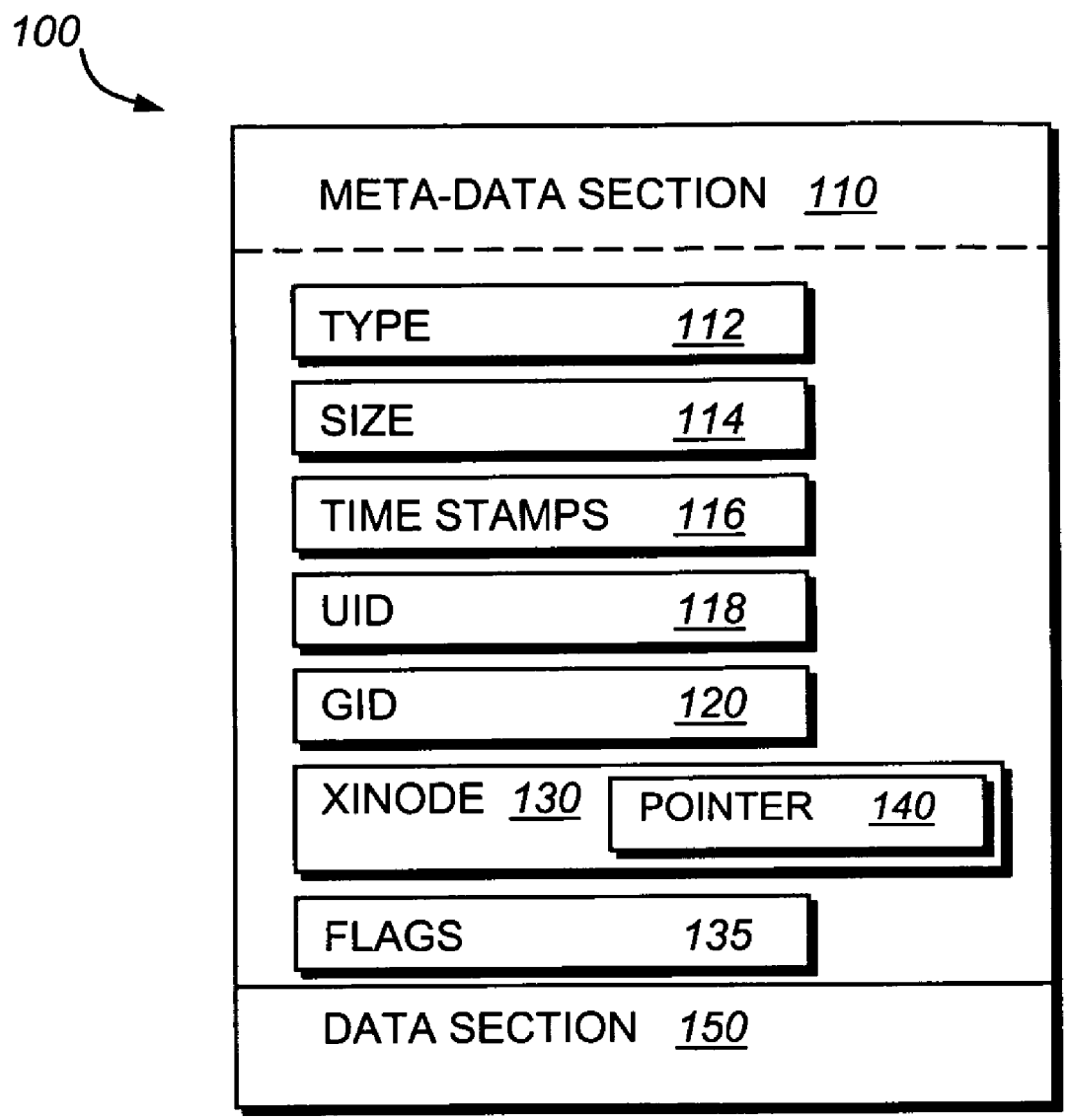
FIG. 1 is a schematic block diagram of an exemplary inode in accordance with an embodiment of the present invention.

An example of a file system used in a storage server is the Write Anywhere File Layout (WAFL®) file system, by Network Appliance, Inc., of Sunnyvale, Calif., which is used in Filer products made by Network Appliance. In the WAFL file system, a file is represented as an inode data structure adapted for storage on disks. FIG. 1 is a schematic block diagram illustrating an exemplary on-disk inode 100, which preferably includes a meta data section 110 and a data section 150. The information stored in the meta data section 110 of each inode 100 describes a file and, as such, includes the type (e.g., regular or directory) 112 of the file, the size 114 of a file, time stamps (e.g., accessed and/or modification) 116 for the file and ownership, i.e., user identifier (UID 118) and group identifier (GID 120), of the file. The meta data section 110 further includes a xinode field 130 containing a pointer 140 that references another on-disk inode structure containing, e.g., access control list (ACL) information associated with the file or directory.

The inode 100 may also include a flags field 135 where various flags associated with the inode and the file system. The contents of the data section 150 of each inode may be interpreted differently depending upon the type of file (inode) defined within the type field 112. For example, the data section 150 of a directory inode contains meta data controlled by the file system, whereas the data section of a regular inode contains user-defined data. In this latter case the data section 150 includes a representation of the data associated with the file.

Specifically, the data section 150 of a regular on-disk inode may include user data or pointers, the latter referencing 4 kilobyte (KB) data blocks on disk used to store the user data. Each pointer is preferably a logical volume block number which is thereby facilitate efficiency among a file system and/or disk storage layer of an operating system when accessing the data on disks. Given the restricted size (e.g., 128 bytes) of the inode, user data having a size that is less than or equal to 64 bytes is represented in its entirety within the data section of an inode. However if the user data is greater than 64 bytes but less than or equal to 64 kilobytes (KB), then the data section of the inode comprises up to 16 pointers, each of which references a 4 KB block of data on disk. Moreover, if the size of the data is greater than 64 KB but less than or equal to 64 megabytes (MB), then each pointer in the data section 150 of the inode references an indirect inode that contains 1024 pointers, each of which references a 4 kilobyte data block on disk.

A persistent consistency point image (PCPI) is a point-in-time representation of the storage system, and more particularly, of the active file system, stored on a storage device or in other persistent memory and having a name or other identifier that distinguishes it from other PCPIs taken at other points in time. A PCPI may be used, for example, to enable data mirroring and/or to allow recovery of stored data in the event of a failure of the storage system. A PCPI can also include other information (metadata) about the active file system at the particular point in time for which the image is taken. The terms "PCPI" and "snapshot" shall be used interchangeably through out this patent without derogation of Network Appliance's trademark rights in the mark Snapshot™.

Figure 2:
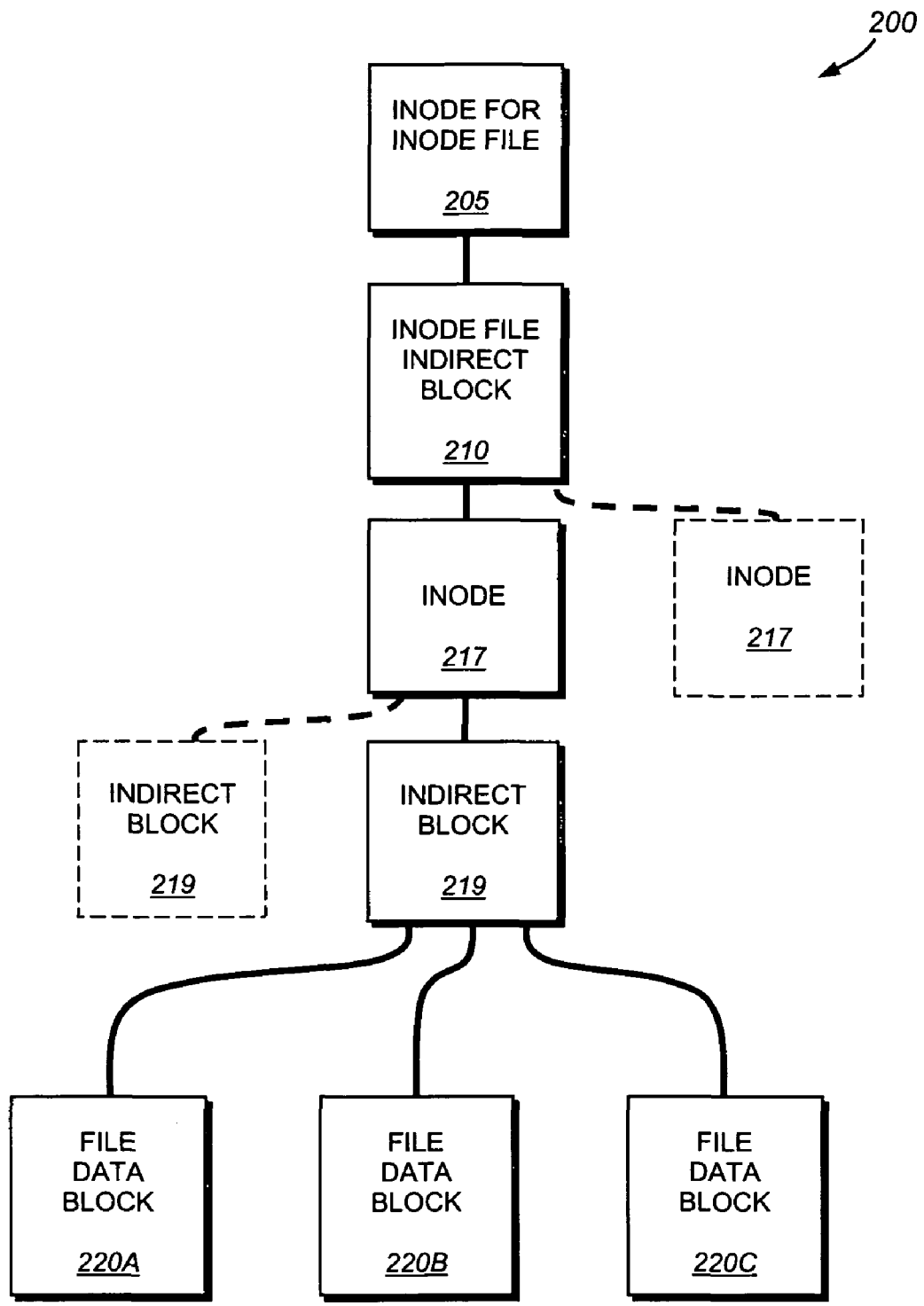
FIG. 2 is a schematic block diagram of an exemplary inode tree.
Figure 3:
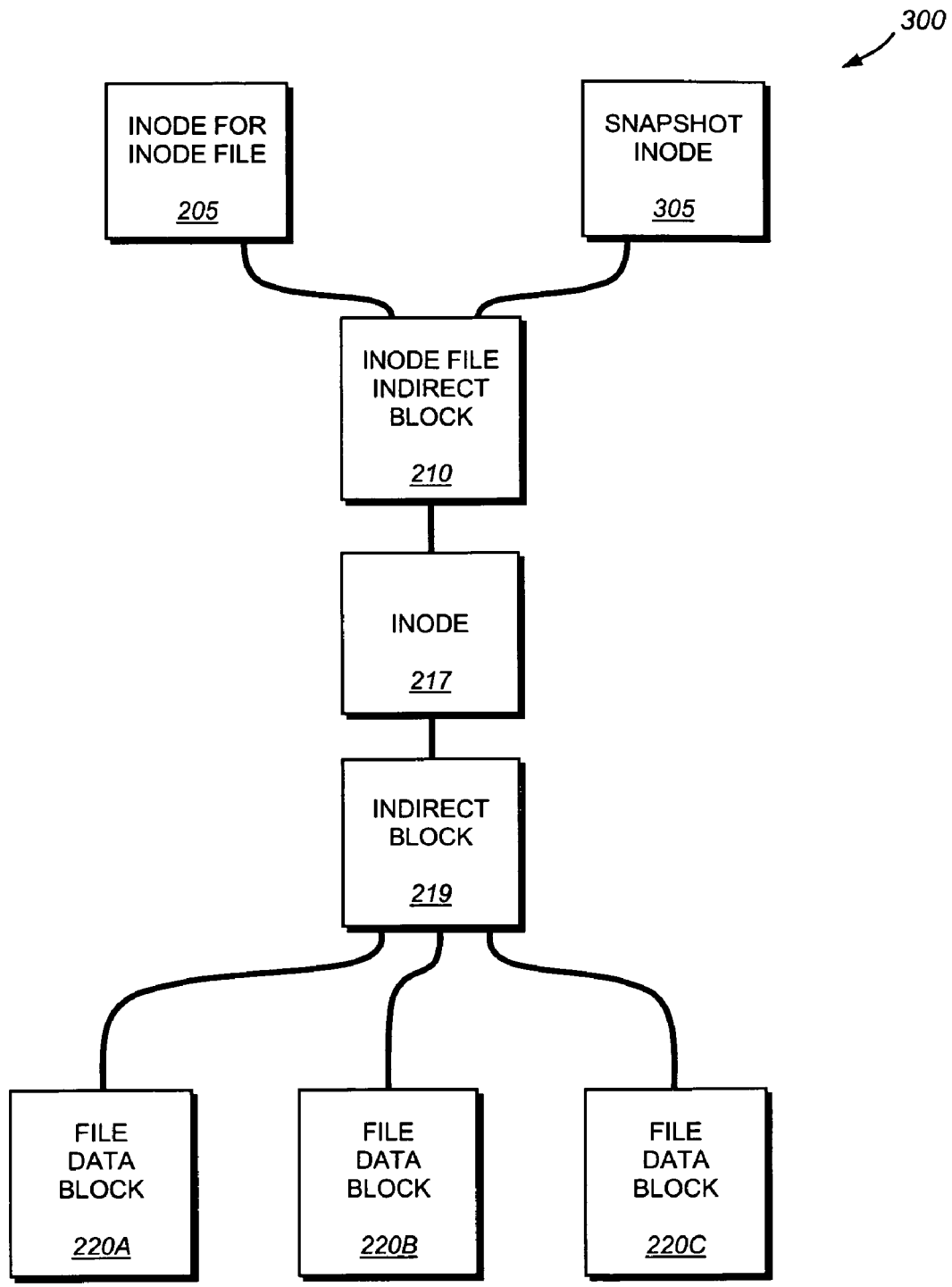
FIG. 3 is a schematic block diagram of an exemplary inode tree showing a snapshot inode.

When the file system generates a snapshot of a given file system, a snapshot inode is generated as shown in FIG. 3. The snapshot inode 305 is, in essence, a duplicate copy of the inode for the inode file 205 of the file system 200. Thus, the exemplary file system structure 200 includes the inode file indirect blocks 210, inodes 217, indirect blocks 219 and file data blocks 220A-C as in FIG. 2. When a user modifies a file data block, the file system layer writes the new data block to disk and changes the active file system to point to the newly created block.

Figure 4:
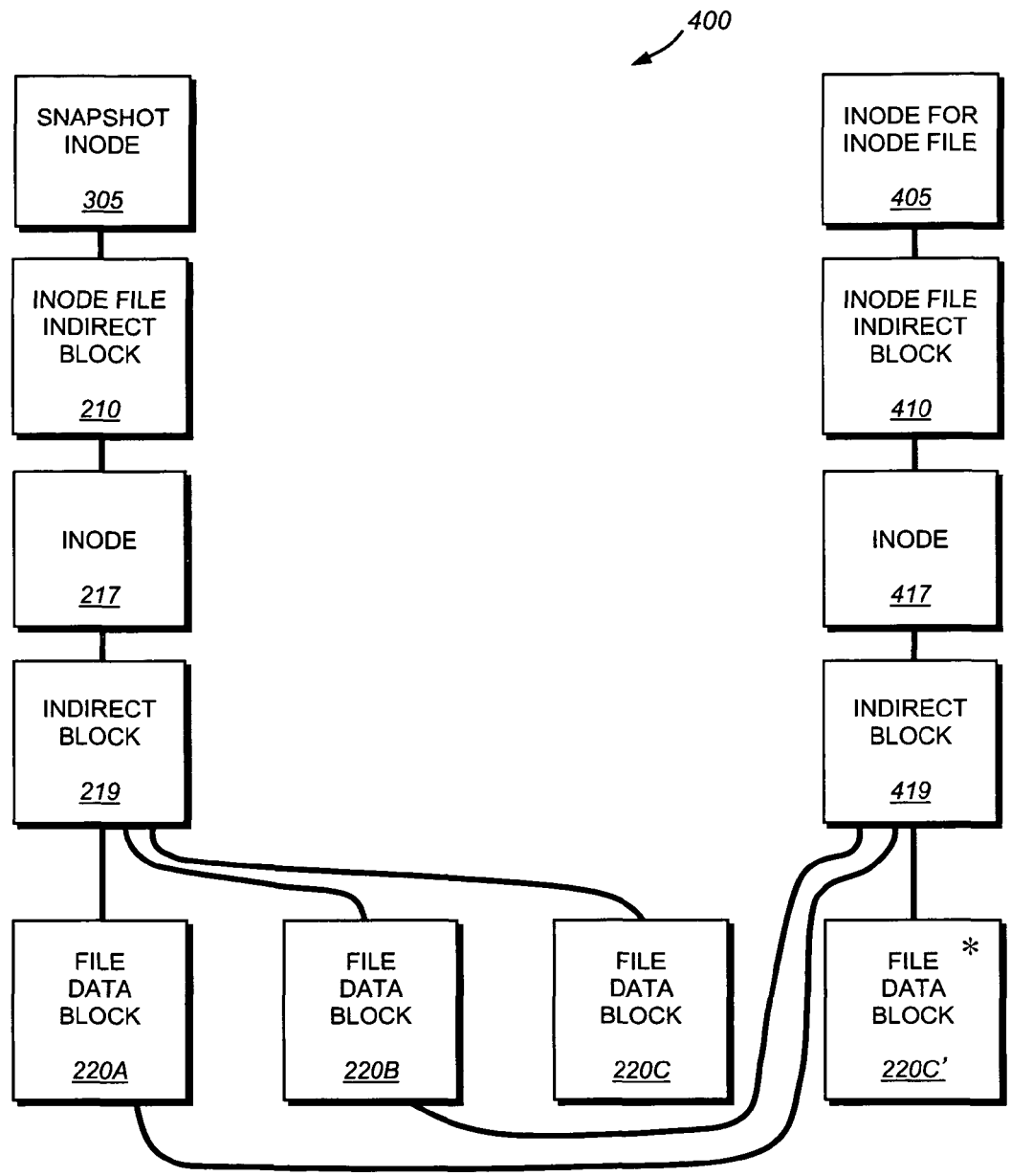
FIG. 4 is a schematic block diagram of an exemplary inode tree and snapshot inode tree showing data being written to a file after a snapshot was generated.

FIG. 4 shows an exemplary inode file system structure 400 after a file data block has been modified. In this illustrative example, file data block 220C was modified to file data block 220C'. When file data block 220C is modified to file data block 220C', the contents of the modified file data block are written to a new location on disk as a function of the exemplary WAFL file system. Because of this new location, the indirect block 419 must be rewritten. Due to this changed indirect block 419, the inode 417 must be rewritten. Similarly, the inode file indirect block 410 and the inode for the inode file 405 must be rewritten. Thus, after a file data block has been modified the snapshot inode 305 contains a point to the original inode file indirect block 210 which in turn contains pointers through the inode 217 and an indirect block 219 to the original file data blocks 220A, 220B and 220C. However, the newly written indirect block 419 includes pointers to unmodified file data blocks 220A and 220B. The indirect block 419 also contains a pointer to the modified file data block 220C' representing the new arrangement of the active file system. A new inode for the inode file 405 is established representing the new structure 400. Note that metadata (not shown) stored in any snapshotted blocks (e.g., 305, 210, and 220C) protects these blocks from being recycled or overwritten until they are released from all snapshots. Thus, while the active file system inode for the inode file 405 points to new blocks 220A, 220B and 220C', the old blocks 210, 217, 219 and 220C are retained until the snapshot is fully released.

Storage System Environment

Figure 5:
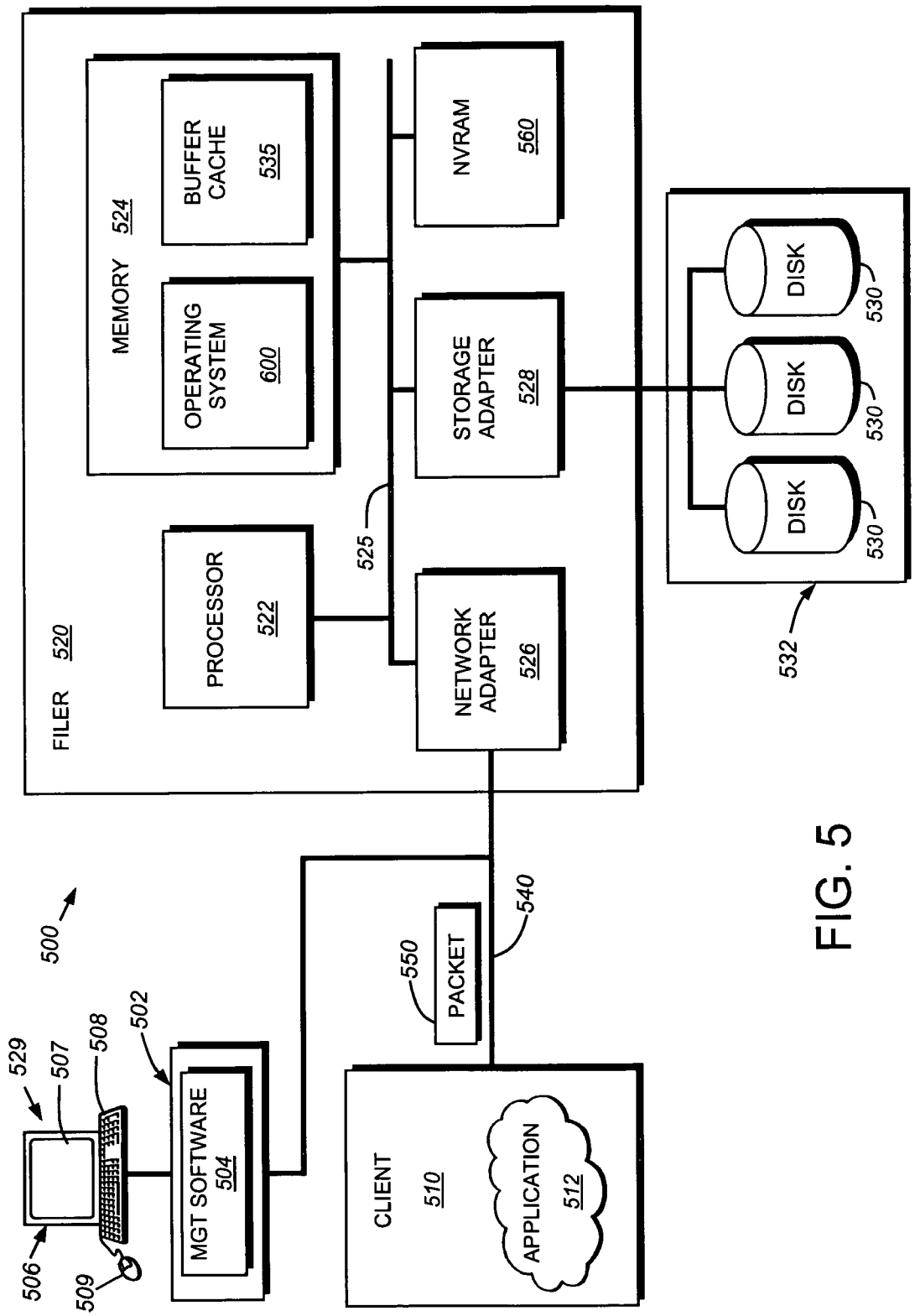
FIG. 5 is a schematic block diagram of an exemplary file server environment in accordance with an embodiment of the present invention.

FIG. 5 is a schematic block diagram of a storage system environment 500 that includes a client 510 having one or more applications 512, and an interconnected file server 520 that may be advantageously used with the present invention. The filer server or "filer" 520 is a computer that provides file service relating to the organization of information on storage devices, such as disks 530. It will be understood to those skilled in the art that the inventive technique described herein may apply to any type of special-purpose computer (e.g., server) or general-purpose computer, including a standalone computer. The filer 520 comprises a processor 522, a memory 524, a network adapter 526 and a storage adapter 528 interconnected by a system bus 525. The filer 520 also includes a storage operating system 600 that implements a file system to logically organize the information as a hierarchical structure of directories and files on the disks. A console or other user interface 529 is provided to control various filer functions, including those implemented according to this invention, and report on the status of filer operations.

It will be understood to those skilled in the art that the inventive technique described herein may apply to any type of special-purpose computer (e.g., file serving appliance) or general-purpose computer, including a standalone computer, embodied as a storage system. To that end, filer 520 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 524 comprises storage locations that are addressable by the processor and adapters for storing software program code. A portion of the memory may be further organized as a "buffer cache" 535 for storing data structures that are passed between disks and the network during normal runtime operation. The memory comprises a form of random access memory (RAM) that is generally cleared by a power cycle or other reboot operation (e.g., it is a "volatile" memory). The processor and adapters may, in turn, comprise processing elements and/or logic circuitry configured to execute the software code and manipulate the data structures. The operating system 600, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 526 comprises the mechanical, electrical and signaling circuitry needed to connect the filer 520 to a client 510 over a computer network 540, which may comprise a point-to-point connection or a shared medium, such as a local area network. The client 510 may be a general-purpose computer configured to execute applications 512, such as a database application. Moreover, the client 510 may interact with the filer 520 in accordance with a client/server model of information delivery. That is, the client may request the services of the filer, and the filer may return the results of the services requested by the client, by exchanging packets 550 encapsulating, e.g., the CIFS protocol or NFS protocol format over the network 540.

The storage adapter 528 cooperates with the operating system 600 executing on the filer to access information requested by the client. The information may be stored on the disks 530 of a disk shelf 532 that is attached, via the storage adapter 528 to the filer 520 or other node of a storage system as defined herein. The storage adapter 528 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 522 (or the adapter 528 itself) prior to being forwarded over the system bus 525 to the network adapter 526, where the information is formatted into a packet and returned to the client 510.

In one exemplary filer implementation, the filer 520 can include a nonvolatile random access memory (NVRAM) 560 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

Connected to the LAN 540 may be a station using which a maintenance operator can interface with the system. A management station 502 can include a server or PC-based computer in a console 529 with a network interface for communicating over the LAN 540. Within the management station 502, resides appropriate management software 504. A graphical user interface (GUI) 506 may include a display 507, a keyboard 508 and a mouse 509 so that a maintenance operator can enter commands into the system.

In an illustrative embodiment, the disk shelf 532 is arranged as a plurality of separate disks 530. The disk shelf 532 may include, in some embodiments, dual connectors for redundant data paths. The disks 530 are arranged into a plurality of volumes, each having a file system associated therewith. The volumes each include one or more disks 530. In one embodiment, the physical disks 530 are configured into RAID groups so that some disks store striped data and some disks store separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

Storage Operating System

To facilitate generalized access to the disks on the array, a storage operating system 600 (FIG. 6) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. In one embodiment, the storage operating system is one that implements a write anywhere file layout file (WAFL) system such as Network Appliance's ONTAP™.

The term "storage operating system" generally refers to the computer-executable code operable on a storage system that manages data access and, in the case of a file server, implements file system semantics (such as the above-referenced WAFL).

Figure 6:
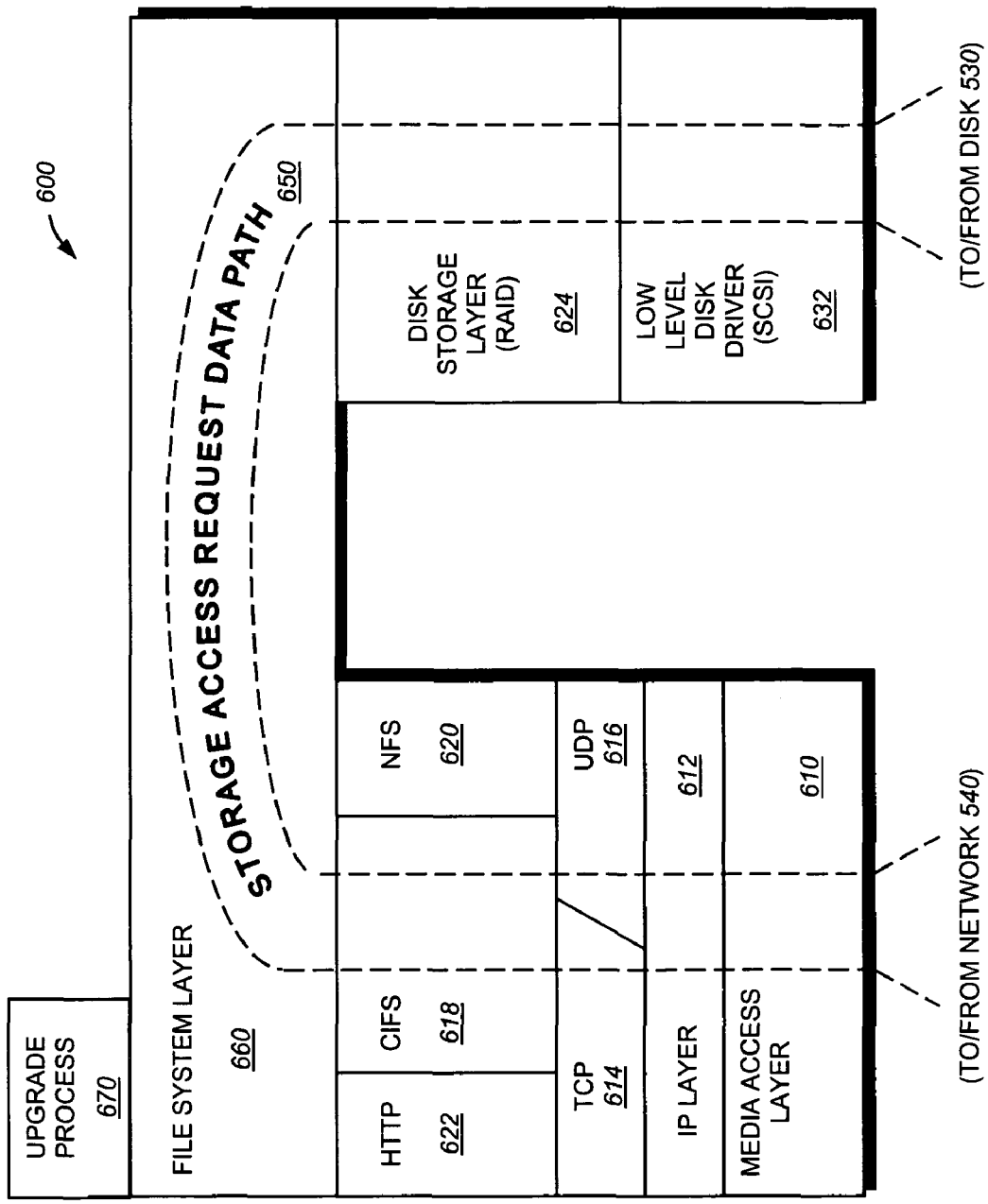
FIG. 6 is a schematic block diagram of an exemplary storage operating system in accordance with an embodiment of the present invention.

The organization of the preferred storage operating system for an embodiment of a filer is now described briefly. As shown in FIG. 6, the storage operating system 600 comprises a series of software layers, including a media access layer 610 of network drivers including but not limited to Ethernet. The operating system further includes network protocol layers, such as the Internet Protocol (IP) layer 612 and its supporting transport mechanisms, the Transport Control Protocol (TCP) layer 614 and the User Datagram Protocol (UDP) layer 616. A file system protocol layer provides multi-protocol data access and, to that end, includes support for the CIFS protocol 618, the NFS protocol 620 and the Hypertext Transfer Protocol (HTTP) protocol 622. In addition, the storage operating system 600 includes a disk storage layer 624 that implements a disk storage protocol, such as a RAID protocol, a disk configuration verification layer 626, a disk driver layer 628, a storage disk manager layer 630 and a low-level disk driver that implements a disk control protocol such as the small computer system interface (SCSI) 632.

Bridging the disk software layers with the network and file system protocol layers is a file system layer 660 of the storage operating system 600. Generally, the layer 660 implements a file system having an on-disk format representation that is block-based using, e.g., 4-kilobyte (KB) data blocks and using inodes to describe the files. Note that while files are implemented in an illustrative embodiment, the term "file" should be taken broadly to include any type of data organization or "data container", including those used by block-level protocols, such as SCSI. The term "data container" will therefore be used interchangeably for files herein. As used herein, a file system is a programmatic entity that imposes structure on the address space of one or more physical or virtual disks so that the storage operating system may conveniently deal with data containers, including files. An "active file system" is a file system to which data can be both written and read, or, more generally, an active store that responds to both read and write I/O operations. A snapshot is a reference store or image of the file system at a point in time that is typically read-only.

The term "data container", as noted above, shall refer generally to a file, LUN (logical unit number), or any other separately or individually addressable data structure or logical group of data blocks residing on persistent storage. The term "volume" in this context shall refer to a logical group of data containers. The term "directory" shall refer to an organizational structure that facilitates access to a given data container through traversal of trees or other logical indexing structures. Likewise, the term "pathway" or "path" shall refer to the route taken by the storage operating system through the directory structure in addressing the data container. In addition, it is expressly contemplated that the teachings of the present invention can be applied to a variety of storage environments and data types including, but not limited to, file data, database data and/or block-level data.

In response to transaction requests, the file system generates operations to load (retrieve) the requested data from volumes if it is not resident "in-core" in the filer's memory. If the information is not in memory, the file system layer 660 indexes into the inode file using the inode number to access an appropriate entry and retrieve a logical volume block number. The file system layer 660 then passes the logical volume block number to the disk storage (RAID) layer 624, which maps that logical number to a disk block number and sends the latter to an appropriate driver (for example, an encapsulation of SCSI implemented on a fibre channel disk interconnection) of the disk driver layer 626. The disk driver accesses the disk block number from volumes and loads the requested data in memory for processing by the filer. Upon completion of the request, the filer (and storage operating system) returns a reply to the client over the network. An embodiment of a reply is a conventional acknowledgement packet defined by the Common Internet File System (CIFS) specification.

It should be noted that the software "path" 650 through the storage operating system layers described above needed to perform data storage access for the client request received at the filer may alternatively be implemented in hardware or a combination of hardware and software. That is, in an alternate embodiment, the storage access request data path 650 may be implemented as logic circuitry embodied within a field programmable gate array (FPGA) or an application specific integrated circuit (ASIC). This type of hardware implementation increases the performance of the file service provided by filer in response to a file system request packet issued by client.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

In order to improve reliability and facilitate disaster recovery in the event of a failure of a filer, its associated disks or some portion of the storage infrastructure, it is common to "mirror" or replicate some or all of the underlying data and/or the file system that organizes the data. In one example, a mirror is established and stored at a remote site, making it more likely that recovery is possible in the event of a true disaster that may physically damage the main storage location or its infrastructure (e.g. a flood, power outage, act of war, etc.). The mirror is updated at regular intervals, typically set by an administrator, in an effort to catch the most recent changes to the file system. One common form of update involves the use of a "snapshot" process in which the active file system at the storage site, consisting of inodes and blocks, is captured and the "snapshot" is transmitted as a whole, over a network (such as the well-known Internet) to the remote storage site. The primary storage device, e.g., a set of disks, stores the active file system, while a secondary storage, e.g. a tape drive, may be utilized to store backups of the active file system. Once snapshotted, the active file system is reestablished, leaving the snapshotted version in place for possible disaster recovery. Each time a snapshot occurs, the old active file system becomes the new snapshot, and the new active file system carries on, recording any new changes. A set number of snapshots may be retained depending upon various time-based and other criteria.

The complete recopying of the entire file system to a remote (destination) site over a network may be quite inconvenient where the size of the file system is measured in tens or hundreds of gigabytes (even terabytes). This full-backup approach to remote data replication may severely tax the bandwidth of the network and also the processing capabilities of both the destination and source filer. One solution has been to limit the snapshot to only portions of a file system volume that have experienced changes.

The source creates a pair of time-separated snapshots of the volume. These can be created as part of the commit process in which data is committed to non-volatile memory in the filer or by another mechanism. The "new" snapshot is a recent snapshot of the volume's active file system. The "old" snapshot is an older snapshot of the volume, which should match the image of the file system replicated on the destination mirror. Note, that the file server is free to continue work on new file service requests once the new snapshot is made. The new snapshot acts as a check-point of activity up to that time rather than an absolute representation of the then-current volume state. A differencer scans the blocks in the old and new snapshots. In particular, the differencer works in a block-by-block fashion, examining the list of blocks in each snapshot to compare which blocks have been allocated. In the case of a write-anywhere system, the block is not reused as long as a snapshot references it, thus a change in data is written to a new block. Where a change is identified (denoted by a presence or absence of an 'X' designating data), a decision process in the differencer decides whether to transmit the data to the destination. The process compares the old and new blocks as follows: (a) Where data is in neither an old nor new block no data is available to transfer. (b) Where data is in the old block, but not the new data has already been transferred, (and any new destination snapshot pointers will ignore it), so the new block state is not transmitted. (c) Where data is present in the both the old block and the new block no change has occurred and the block data has already been transferred in a previous snapshot. (d) Finally, where the data is not in the old block, but is in the new block, then a changed data block is transferred over the network to become part of the changed volume snapshot set at the destination as a changed block. In the exemplary write-anywhere arrangement, the changed blocks are written to new, unused locations in the storage array. Once all changed blocks are written, a base file system information block, that is the root pointer of the new snapshot, is then committed to the destination. The transmitted file system information block is committed, and updates the overall destination file system by pointing to the changed block structure in the destination, and replacing the previous file system information block. The changes are at this point committed as the latest incremental update of the destination volume snapshot. This file system accurately represents the "new" snapshot on the source. In time a new "new" snapshot is created from further incremental changes.

On-the-Fly Accounting

As used herein, the number of blocks that have the snapshot with SnapshotID of N as the "youngest" owner is represented by Youngest_owner(N). Thus, Youngest_owner(0) represents the number of blocks that have the active file system (SnapshotID 0) as their youngest owner. A snapshot is the youngest owner of a given block if it uses the block and no newer snapshots, including the active file system, are using the given block. This calculation is performed by examining a block map stored by the file system. In an embodiment, the Youngest_owner( ) value is written to the file system information (FSinfo) block associated with the snapshot. The FSinfo block includes various metadata for use by the file system in managing the snapshot and/or active file system. Block map will also be used interchangeably with Fsinfo.

The oldest owner of a given block is a snapshot that uses the block and no older snapshots use the block (e.g., snapshots taken further back in time). In one embodiment, a snapshot marks a block as in use. Thus, for example, if a block is newly allocated, its oldest owner is the active file system (SnapshotID 0) as no older snapshots use the newly allocated block. As used herein, the number of blocks that have the snapshot with SnapshotID of N as their oldest owner is represented by Oldest_owner(N). In an embodiment the Oldest_owner( ) value is also written to the FSinfo block associated with the selected snapshot.

Figure 7:
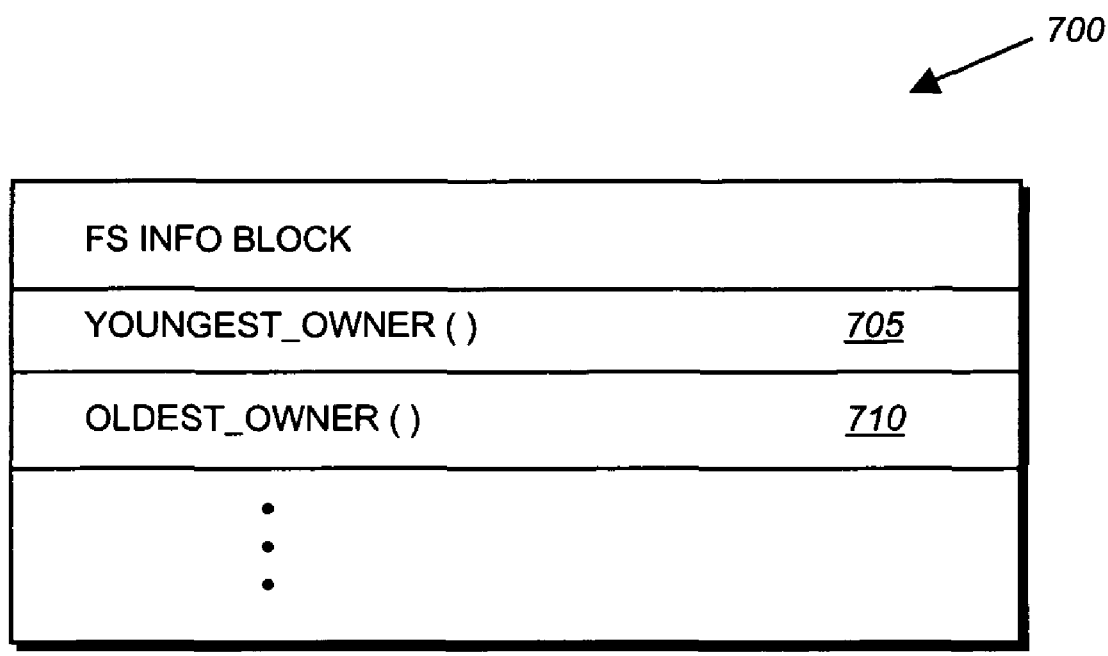
FIG. 7 is an exemplary schematic block diagram of an illustrative file system information block in accordance with an embodiment of the present invention.

FIG. 7 is an exemplary block diagram of a file system information (FSinfo) block 700 that may be utilized in accordance with the present invention. In the exemplary embodiment, the FSinfo block 700 includes a field for the Youngest_owner( ) count 705 and a field for the Oldest_owner( ) count 710. The Youngest_owner( ) count 705 field is used by the storage operating system, and more specifically, in the illustrative embodiment, the file system, to store the current Youngest_owner( ) count associated with the snapshot related to this FSinfo block. Similarly, the Oldest_owner( ) count 710 field is used by the file system to store the current Oldest_owner( ) values for the snapshot associated with the FSinfo block.

It is important to maintain Oldest_owner( ) and Youngest_owner( ) values when performing various file system operations. FIGS. 8-11, described further below, detail various block accounting procedures performed in the illustrative embodiment, in response to various file system operations. It should be noted that procedures 800-1100 require that if a block is used by any snapshot other than the active file system the block may not be then allocated in the active file system. As used herein, the term "Snap shot ID" refers to the snapshot identifier associated with the snapshot being used by the in-progress operation. For example, with reference to procedure 800, described below, Snapshot ID refers to the snapshot identifier of the newly created snapshot.

Figure 8:
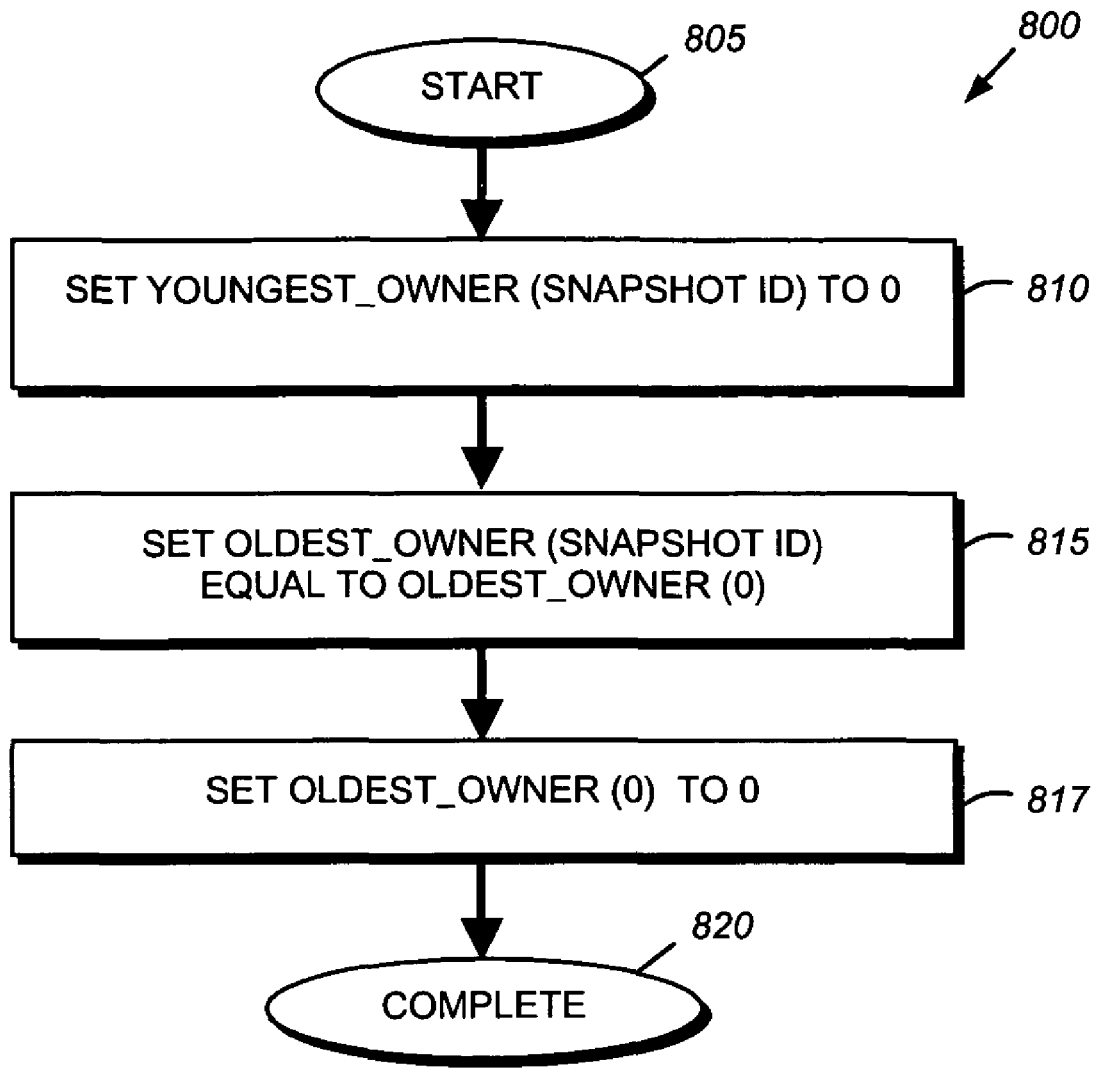
FIG. 8 is a flowchart detailing the steps of a procedure performed in response to the creation of a snapshot in accordance with an embodiment of the present invention.

FIG. 8 is a flowchart an illustrative embodiment detailing the steps of a procedure 800 performed by the file system when a snapshot is created. The procedure begins in step 805 and continues to step 810 where the Youngest_owner (SnapshotID) value is set to 0. As noted above, the SnapshotID of the active file system is 0. Thus, the result of step 810 is to indicate that the newly created snapshot is not the youngest owner of any blocks as all blocks in the newly created snapshot are also owned by the active file system, which is considered to be the youngest of all snapshots. Next, the procedure, in step 815, sets the Oldest_owner (SnapshotID) equal to the value of Oldest_owner (0). Thus, at the creation of a new snapshot, the number of blocks that have this newly created snapshot as their oldest owner is equal to the number of blocks that had the active file system as their oldest owner. The procedure then, in step 817, sets the value of Oldest_owner (0) to zero. Thus, after the creation of a snapshot, the active file system is not the oldest owner of any blocks. The procedure is then complete in step 820.

Figure 9:
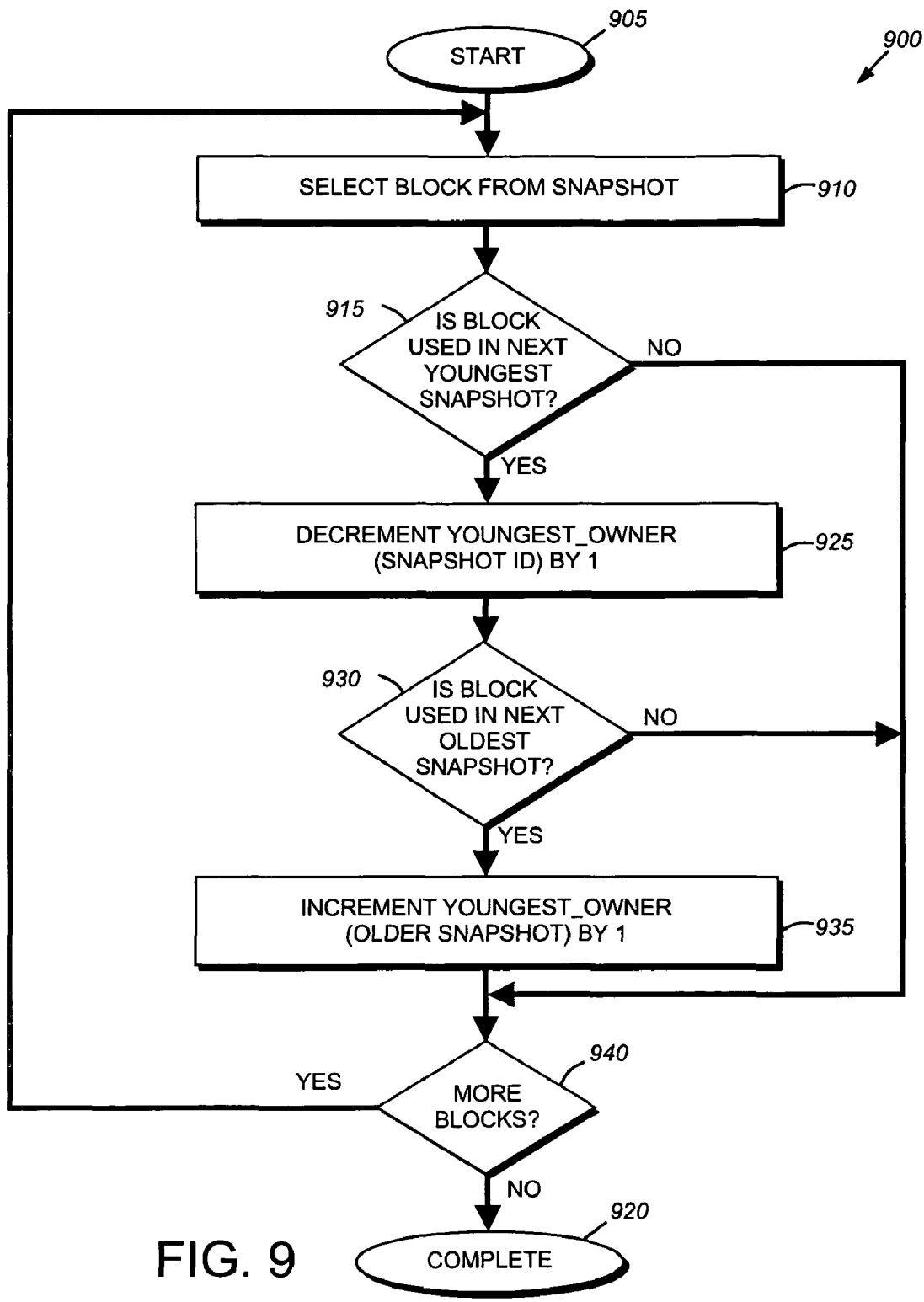
FIG. 9 is a flowchart detailing the steps of a procedure performed when deleting a snapshot in accordance with an embodiment of the present invention.

FIG. 9 is a flowchart of a procedure 900 performed to calculate youngest owner values when deleting a snapshot. This procedure 900 accounts for the blocks contained in the deleted snapshot and updates the appropriate youngest owner values of the snapshots preceding the deleted snapshot. The procedure begins in step 905 and proceeds to step 910 where a block from the deleted snapshot is selected. A determination is then made, in step 915, whether the selected block is used in the next youngest snapshot. If the block is used in the next youngest snapshot, the procedure continues to step 925 where the Youngest_owner(SnapshotID) is decremented by 1.

The procedure then determines, in step 930, whether the block is used in the next oldest snapshot. If the block is used in the next oldest snapshot, the procedure increases Youngest_owner(Older Snapshot) by 1 in step 935. The procedure continues to step 940 where it determines if there are additional blocks to account for in the snapshot. If there are additional blocks, then the procedure loops back to step 910 and selects another block. Otherwise, the procedure completes in step 920. If the block is not used in the next youngest snapshot (step 915) or is not used in the next oldest snapshot (step 930), the procedure will branch to step 940 to determine if additional blocks exist.

Figure 10:
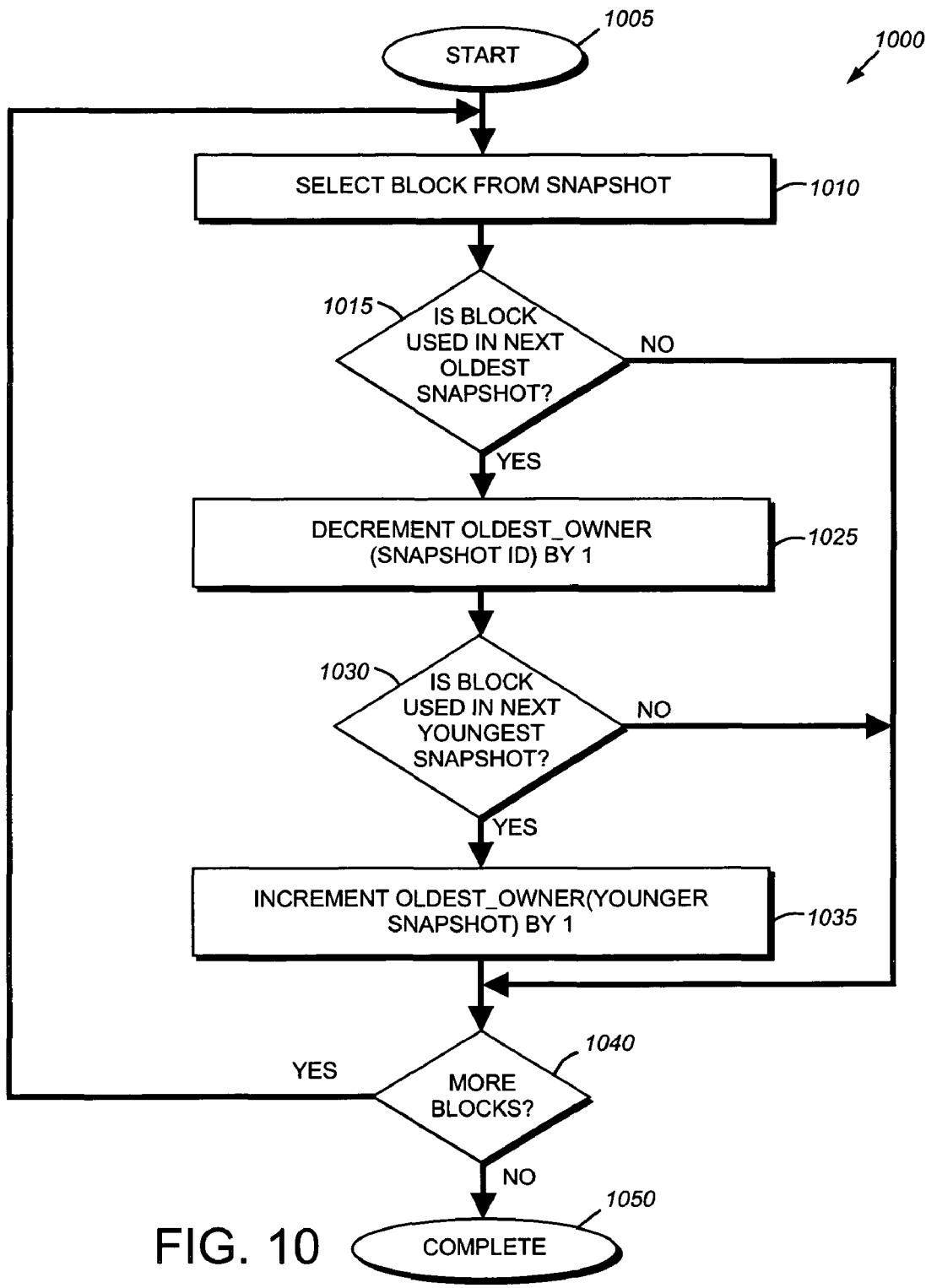
FIG. 10 is a flowchart detailing the steps of a procedure performed when allocating a block in accordance with an embodiment of the present invention.

FIG. 10 is a flowchart of the steps of a procedure 1000 performed to calculate the oldest owner values when deleting a snapshot. The procedure begins in step 1005 and proceeds to step 1010 where a block is selected from the snapshot. Then, in step 1015, a determination is made as to whether the block is used in the next oldest snapshot. If the block is not used in the next oldest snapshot, the procedure continues to step 1025 where the value of Oldest_owner (SnapShot ID) is decremented by 1. Then, the procedure determines if the block is used in the next youngest snapshot in step 1030. If the block is used in the next youngest snapshot, the procedure continues to step 1035 where the value of Oldest_owner(YoungerSnapshot) is increased by 1. The procedure then, in step 1040, determines if additional blocks need to be updated in the snapshot. If additional blocks need to be processed, the procedure loops back to step 1010. Otherwise, the procedure is complete (step 1050).

Figure 11:
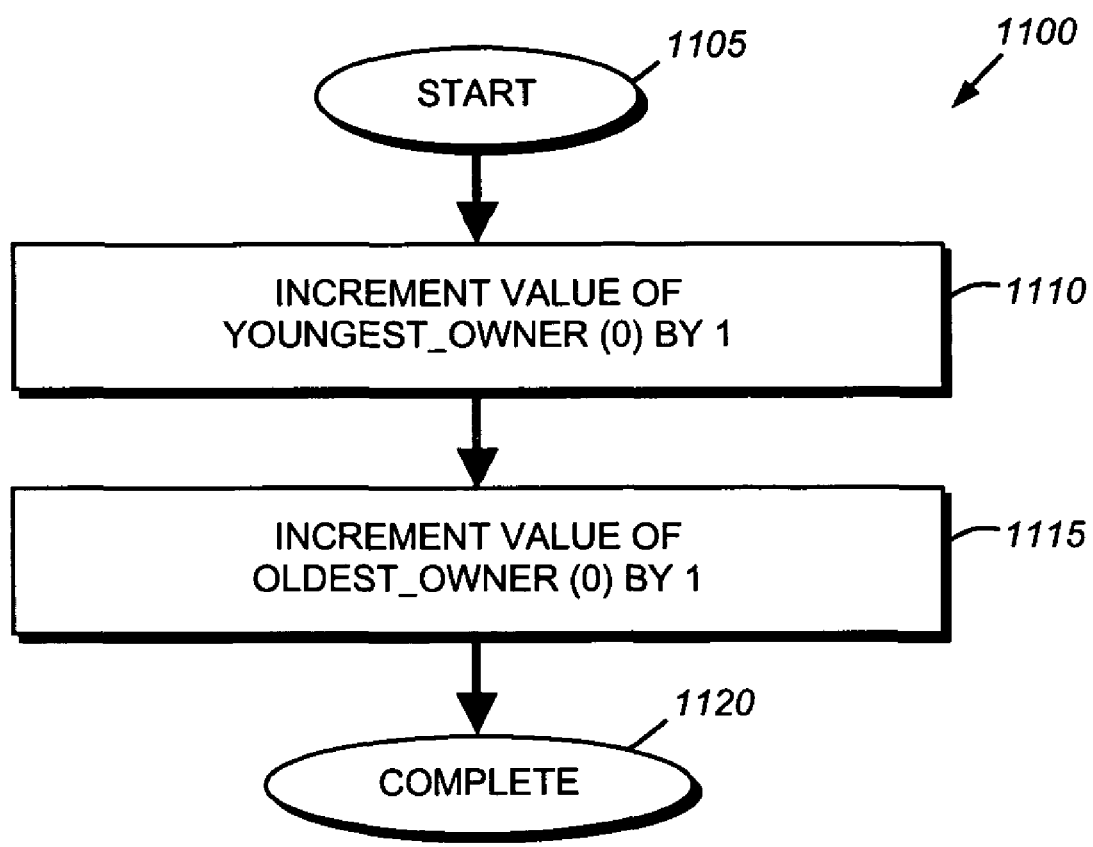
FIG. 11 is a flowchart detailing the steps of a procedure performed when allocating a block in accordance with an embodiment of the present invention.

FIG. 11 is a flowchart detailing a procedure 1100 performed by the file system when allocating a new block. The procedure begins in step 1105 and proceeds to step 1110 where the value of Youngest_owner (0) is incremented by a value of one. Similarly, in step 1115, the value of the Oldest_owner (0) is incremented by a value of one. Thus, the oldest and youngest owners of the newly created block are the active file system. The procedure is then complete in step 1120.

Figure 12:
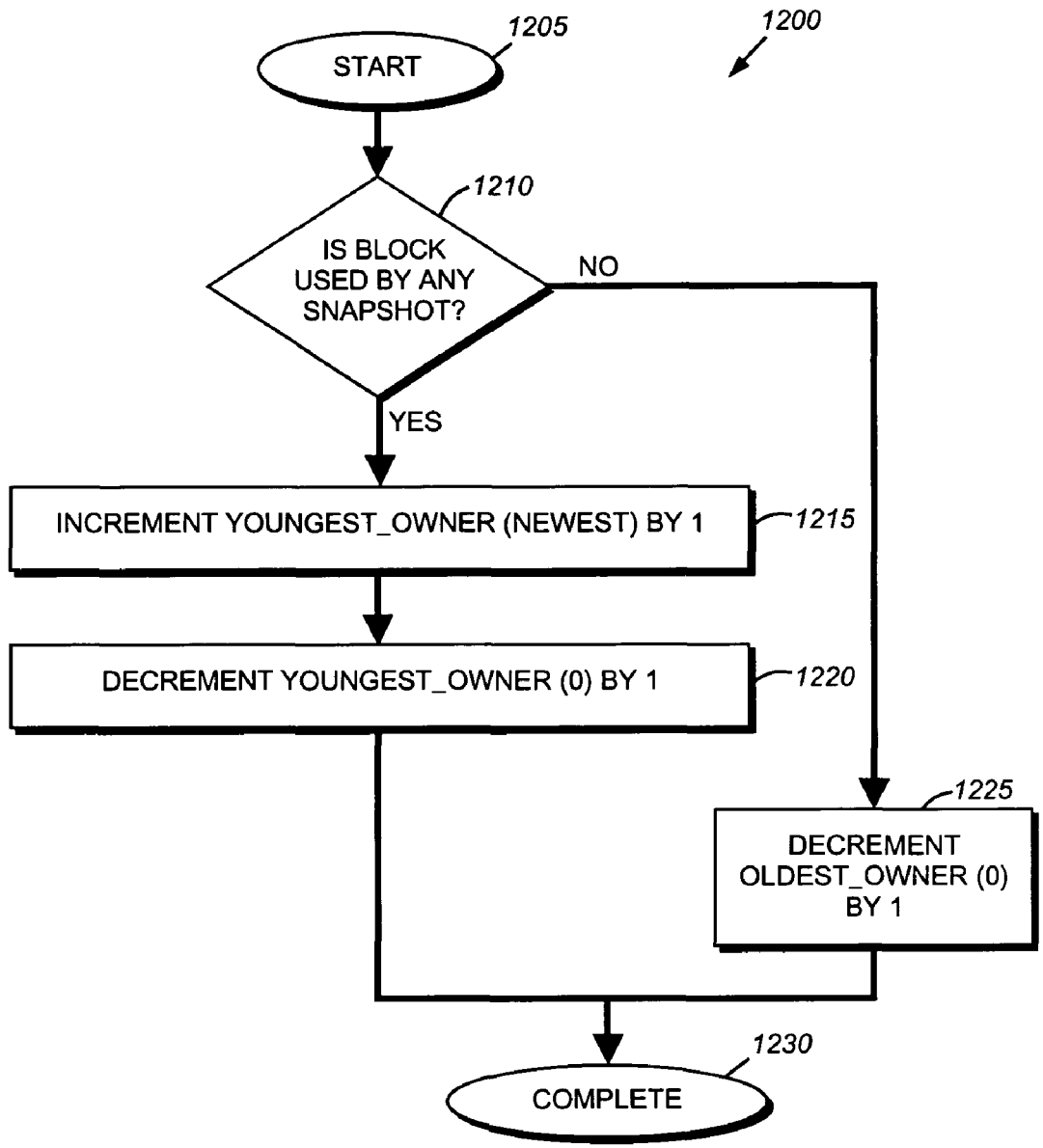
FIG. 12 is a flowchart detailing the steps of a procedure performed when freeing a block in accordance with an embodiment of the present invention.

A procedure 1200 performed by the file system, in the illustrative embodiment, when freeing a block is shown in FIG. 12. The procedure begins in step 1205 and proceeds to step 1210. In step 1210, the procedure determines if the block to be freed is used by any snapshot. If the block is used by any snapshot the procedure continues to step 1215 where the value of the Youngest_owner (newest) is incremented by one. In step 1215, the procedure increases the value of the youngest owner variable associated with the newest snapshot by a value of one. Then, in step 1220, the value of the Youngest_owner (0) is decremented by one. The procedure then continues and is complete in step 1230. However, if in step 1210 it is determined that the block is not used by any snapshot, the procedure branches to step 1225 with a value of the Oldest_owner (0) is decremented by a value of one. From step 1225, the procedure then completes in step 1230.

Thus, by performing the various procedures described in conjunction with FIGS. 8-12, the file system is able to maintain up to date values of the number of blocks that have each snapshot as its youngest and/or oldest owner. A snapshot inquiry command will thus execute substantially faster as it will not require the manual calculation of each of these values, but will instead simply need to retrieve the storage values from the appropriate FSinfo blocks stored on disk.

Another advantage of on the fly accounting is the capability to calculate which blocks a snapshot is the unique owner thereof. A snapshot is the unique owner of a block if it is both the youngest and oldest owner of the block. In other words, the intersection of the set of youngest owner blocks and the set of oldest owner blocks is the set of unique blocks. By calculating the number of unique blocks associated with a snapshot, a determination may be made as to how much space will be freed in a file system should the snapshot be deleted.

Figure 13:
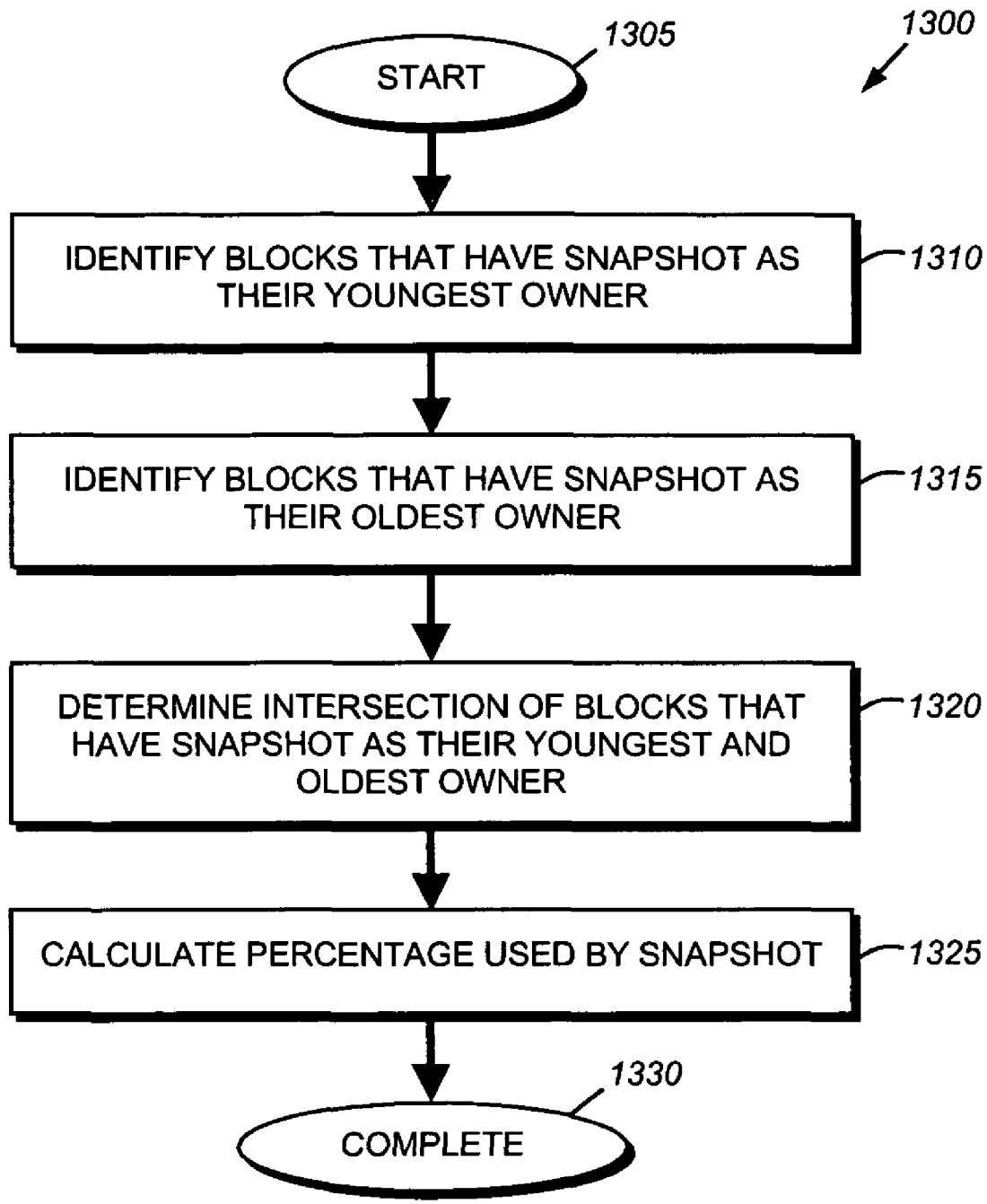
FIG. 13 is a flowchart detailing the steps of a procedure for calculating the space used by a given snapshot in accordance with an embodiment of the present invention.

An exemplary procedure 1300 for calculating the number of unique blocks in a snapshot is shown in FIG. 13. The procedure begins in step 1305 and proceeds to step 1310, where the blocks that have the given snapshot as their youngest owner are identified. The procedure then, in step 1315, identifies those blocks that have the snapshot as their oldest owner. The intersection of these two sets, i.e., those blocks that have the snapshot as both their oldest and youngest owners, is then determined in step 1320. These blocks represent those blocks that are unique to this snapshot, i.e., only are allocated appear in this snapshot and in no others, including the active file system. By using the procedure 1300, the storage operating system or user may determine how many blocks would be freed by deleting a given snapshot.

Figure 14:
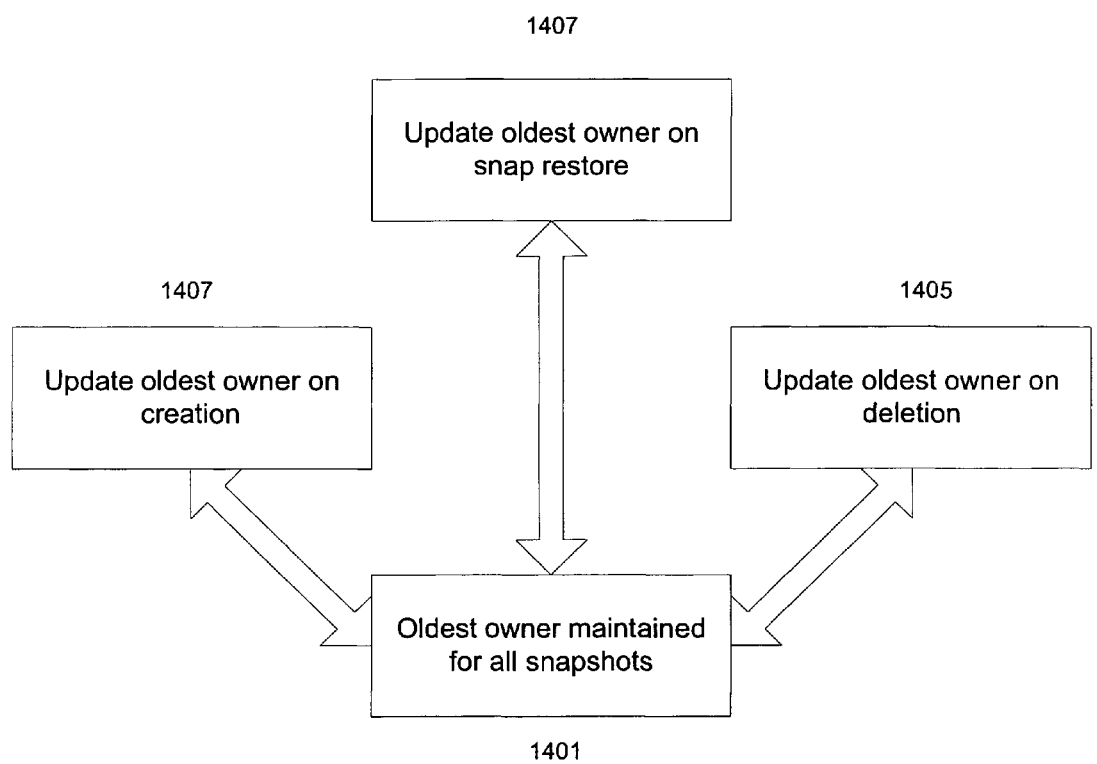
FIG. 14 illustrates the necessary maintenance for the Oldest_owner( ) for an embodiment of the invention.

FIG. 14 illustrates the necessary maintenance for the Oldest_owner( ) for one embodiment of the invention. The Oldest_owner( ) needs to be maintained 1401 whenever a snapshot is created 1403, destroyed 105, or restored 1407. The procedures to do so are covered above.

Figure 15:
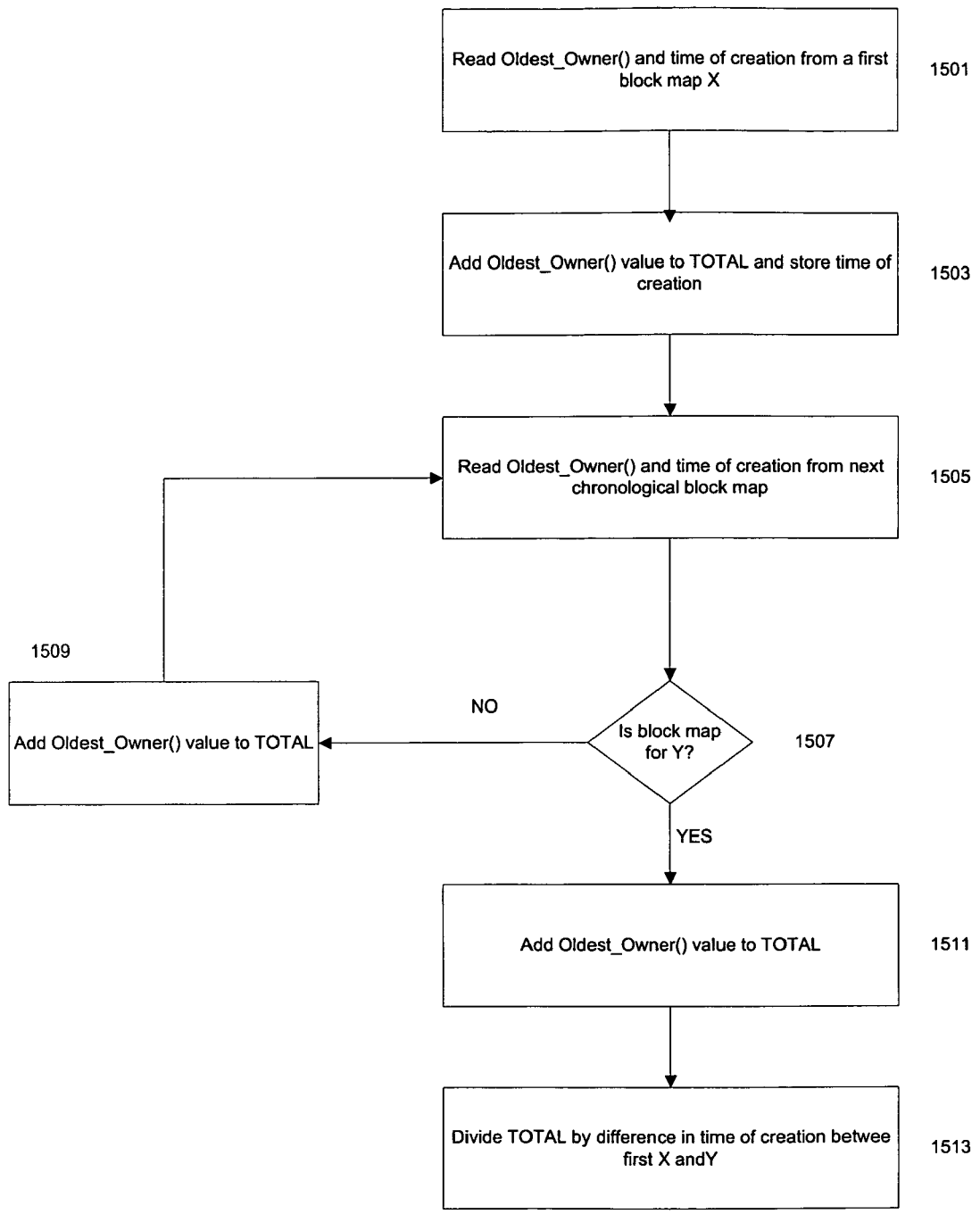
FIG. 15 is a flowchart detailing an embodiment of determining the rate of change of data in a storage system between two snapshots X and Y.

FIG. 15 is a flowchart detailing an embodiment of determining the rate of change of data in a storage system between two snapshots X and Y. At 1501, an Oldest_owner( ) value and time of creation value is read from a first block map associated with one of the two snapshots. This first snapshot can either be the younger (X) or older (Y) block map of the two snapshots that the value of rate of change of data between them is desired. In order to not obscure the invention, X will be used as the first snapshot, however it should be understood that Y can be used. The Oldest_owner( ) value is added to a total and the time of creation of the snapshot is saved 1503.

The next step 1505 is to read in the Oldest_owner( ) and time of creation values for the next chronological snapshot from its block map. As the first snapshot was X (the younger value) the next snapshot would be the one created previous to X (X−1). At 1507 a decision must be made to determine if this next snapshot is Y or not. If it is not, then the Oldest_owner( ) value of this snapshot is added to the total 1509 and the next chronological snapshot's (X−2) block map is read at 1505. If X−1 is Y, then the Oldest_owner( ) value is added to the total 1511. The final step 1513 to determining the rate of change is to divide the total by the difference in creation times between X and Y. Mathematically this is represented by:

$$\frac{\sum_{i=0}^{Y} \text{Oldest\_Owner}(X-i)}{\text{Time Of Creation For } X - \text{Time Of Creation For } Y} \quad (1)$$

Figure 16:
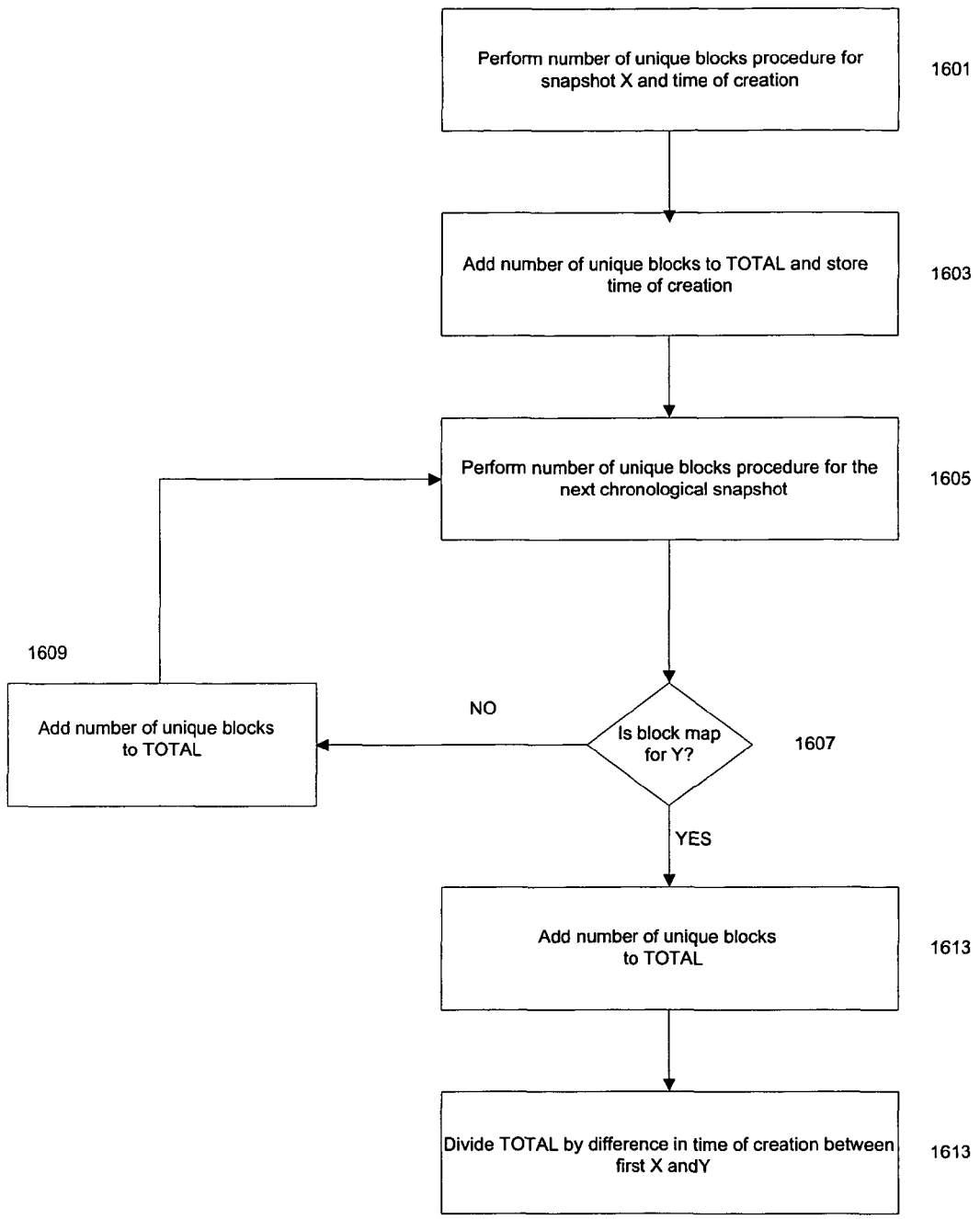
FIG. 16 is a flowchart detailing an embodiment of determining the rate of change of data in a storage system between two snapshots X and Y.

FIG. 16 is a flowchart detailing another embodiment of determining the rate of change of data in a storage system between two snapshots X and Y. This embodiment utilizes the procedure for calculating the number of unique blocks in a snapshot and the time values stored in snapshot. The description of this embodiment will employ the same X and Y as above. The procedure begins by performing the number of unique blocks procedure as described by FIG. 13 on the block map for snapshot X and reading the time of creation for snapshot X. The number of unique blocks for X is added to a total 1603. Next, the number of unique blocks procedure is performed on the next chronological snapshot (in this example X−1) 1605. If this snapshot not Y 1607, then the number of unique blocks determined at 1605 is added to the total 1609 and 1605 is performed on the next chronological snapshot (in this example X−2). If this snapshot is Y 1607, then the number of unique blocks determined at 1605 is added to the total and the time of creation for snapshot Y is read 1611. The final step is to divide the total by the difference between the time of creation of X and Y. This is mathematically represented by:

$$\frac{\sum_{i=0}^{Y} \text{Number Of Unique Blocks}(X-i)}{\text{Time Of Creation For } X - \text{Time Of Creation For } Y} \quad (2)$$

Figure 17:
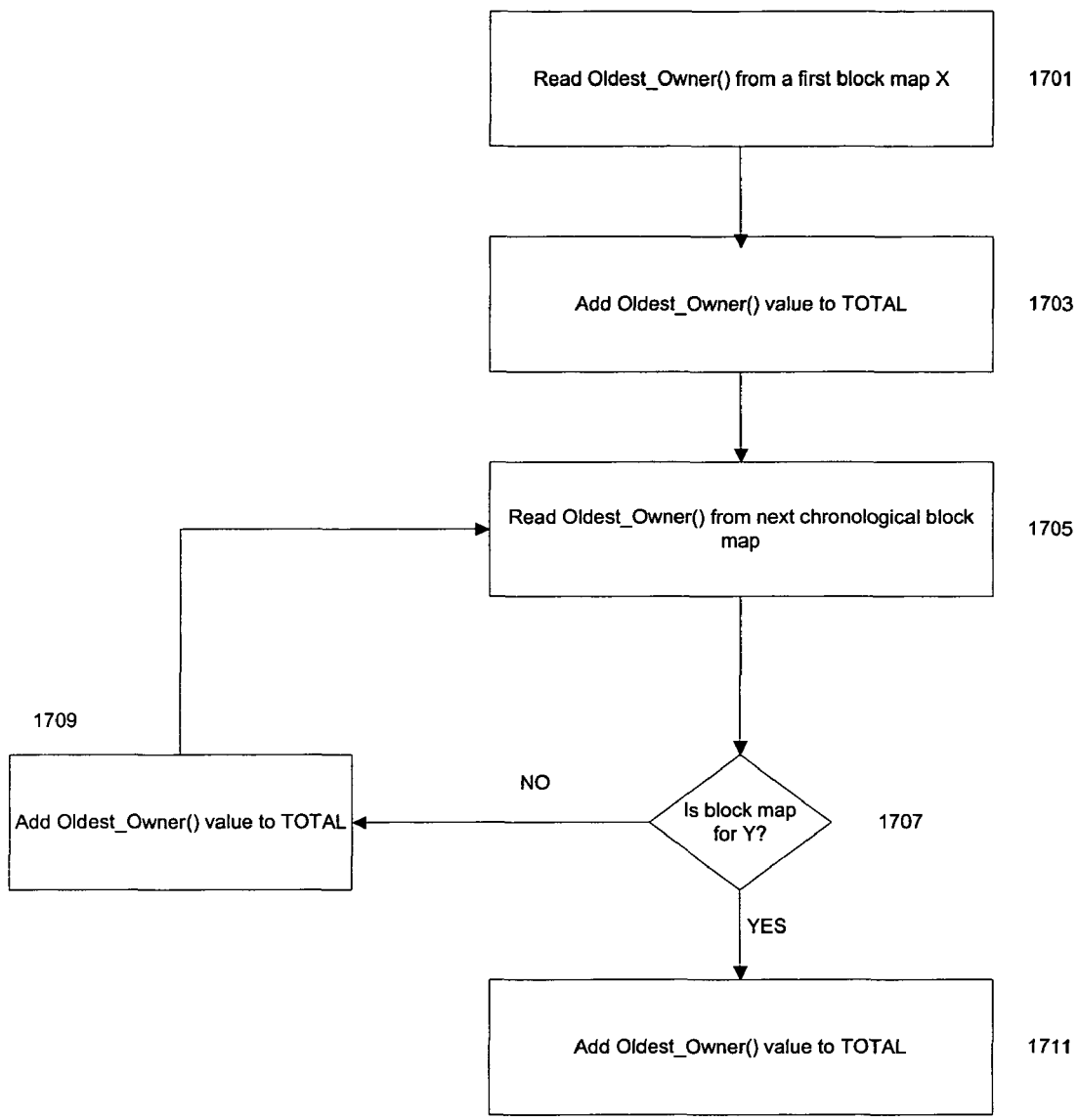
FIG. 17 depicts a flowchart of using on-the-fly accounting to determine the number of new blocks used between two snapshots X and Y, which is used to determine the number of blocks changed between mirror images.

These techniques described above are also applicable to determining the number of blocks transferred between mirrored images. As transferring entirely new mirror images each time a snapshot is created could take a long time to transfer only what is new to the snapshot is transmitted. The less preferred method of calculating scans the entire active map of the respective snapshots, which can be very time consuming. However, using on-the-fly accounting measures the number of new blocks can be quickly calculated. FIG. 17 depicts a flowchart of using on-the-fly accounting to determine the number of new blocks used between two snapshots X and Y. At 1701, an Oldest_owner( ) value is read from a first block map associated with one of the two snapshots. This first snapshot can either be the younger (X) or older (Y) block map of the two snapshots that the value of rate of change of data between them is desired. In order to not obscure the invention, X will be used as the first snapshot, however it should be understood that Y can be used. The Oldest_owner( ) value is added to a total 1703. The next step 1705 is to read in the Oldest_owner( ) value for the next chronological snapshot from its block map. As the first snapshot was X (the younger value) the next snapshot would be the one created previous to X (X−1). At 1707 a decision must be made to determine if this next snapshot is Y or not. If it is not, then the Oldest_owner( ) value of this snapshot is added to the total 1709 and the next chronological snapshot's (X−2) block map is read at 1705. If X−1 is Y, then the Oldest_owner( ) value is added to the total 1711.

Figure 18:
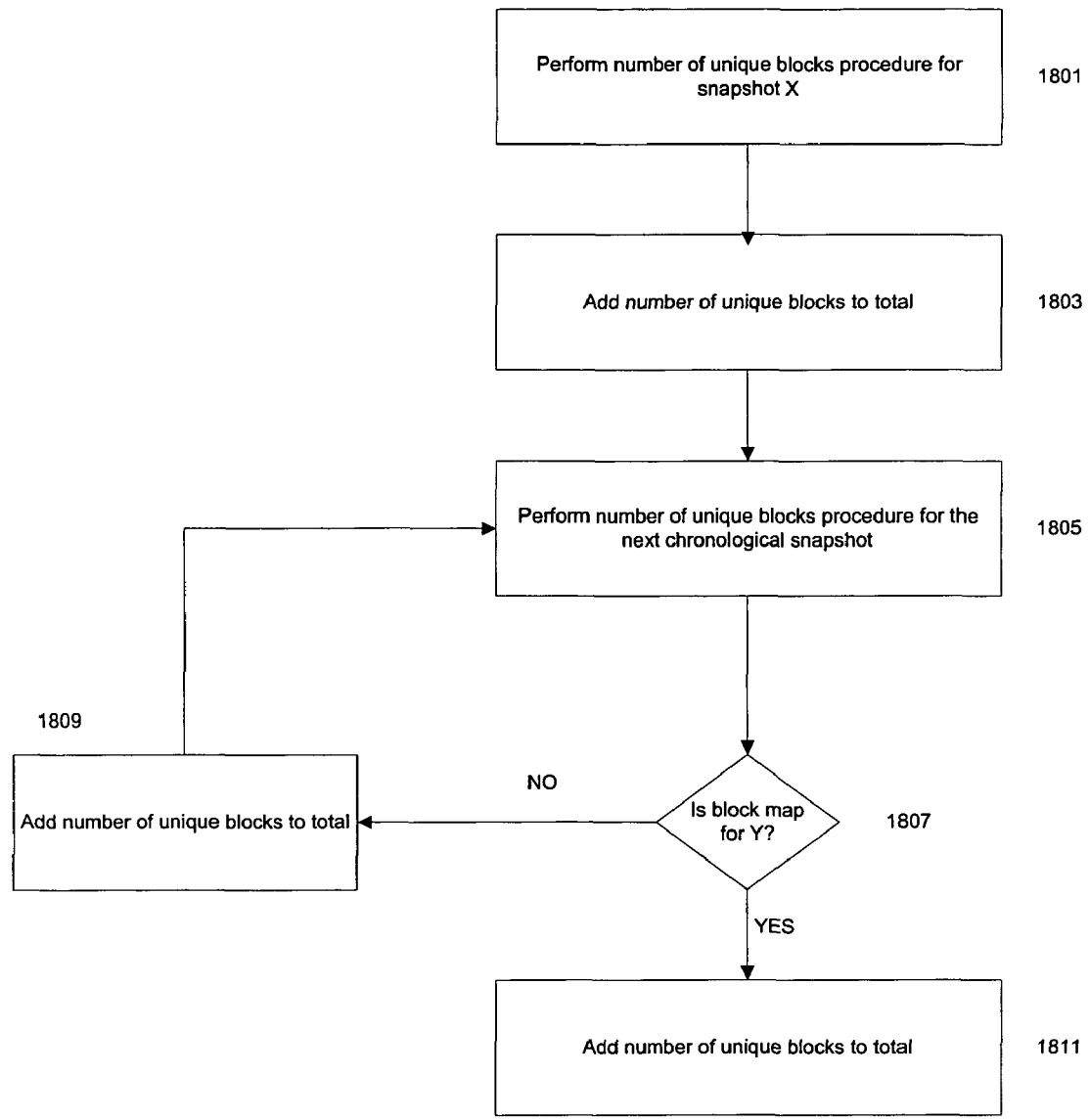
FIG. 18 is a flowchart detailing another embodiment of determining the number of blocks of data changed in a storage system between two snapshots X and Y, which is used to determine the number of blocks changed between mirror images.

FIG. 18 is a flowchart detailing another embodiment of determining the number of blocks of data changed in a storage system between two snapshots X and Y. This embodiment utilizes the procedure for calculating the number of unique blocks in a snapshot and the time values stored in snapshot. The description of this embodiment will employ the same X and Y as above. The procedure begins by performing the number of unique blocks procedure as described by FIG. 13 on the block map for snapshot X 1801. The number of unique blocks for X is added to a total 1803. Next, the number of unique blocks procedure is performed on the next chronological snapshot (in this example X−1) 1805. If this snapshot not Y 1807, then the number of unique blocks determined at 1805 is added to the total 1809 and 1805 is performed on the next chronological snapshot (in this example X−2). If this snapshot is Y 1807, then the number of unique blocks determined at 1805 is added to the total 1811.

To summarize, the present invention uses on-the-fly account management of the youngest and oldest owners of each of the snapshots associated with a storage system to help determine the rate of change of data between two snapshots. Additionally, the number of blocks that have changed between mirror images can also be determined using on-the-fly account management of the youngest and oldest owners of each of the snapshots associated with a storage system.

The foregoing description has been directed to specific embodiments of this invention. It will be apparent, however, that other variations and modifications may be made to the described embodiments, with the attainment of some or all of their advantages. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method comprising:
    creating, by a file server, a first and a second snapshot of a storage system;
    creating, by the file server, a first block map associated with the first snapshot, the first block map including a first number blocks of which the first snapshot is an oldest owner, wherein the first snapshot is the oldest owner of a block if the block is used by the first snapshot and not used by any snapshot older than the first snapshot, wherein the file server calculates the first number of blocks at a time the first snapshot is created and wherein the storage server updates the first number of blocks if changes are made to the storage system that correspond to the first number of blocks;
    creating, by the file server, a second block map associated with the second snapshot, the second block map including a second number of blocks of which the second snapshot is an oldest owner, wherein the second snapshot is the oldest owner of a block if the block is used by the second snapshot and not used by any snapshot older than the second snapshot, wherein the file server calculates the second number of blocks at a time the second snapshot is created and wherein the storage server updates the second number of blocks if changes are made to the storage system that correspond to the second number of blocks;

receiving, by the storage server, a snapshot inquiry command, the snapshot inquiry command received after the creation of the first and second snapshots and after the creation of the first and second block maps;

determining, by the storage server in response to the snapshot inquiry command, a rate of change of data between the first and the second snapshots, wherein the determining the rate of change of data between snapshots includes retrieving the first number of blocks and the second number of blocks from the first and second block maps, and dividing a sum of the first number to the second number by a difference between a time of creation for the first and second snapshots; and reporting, by the storage server via a graphical user interface in response to the snapshot inquiry command, how long available storage in the storage system will last based upon the determined rate of change.

2. The method of claim 1, wherein the corresponding changes include snapshot destruction and snapshot restoration.

3. A method comprising:

creating, by a file server, a first and a second snapshot of a storage system;

storing, by the file server, a first block map associated with the first snapshot, the first block map including a first number blocks of which the first snapshot is an youngest owner, wherein the first snapshot is the youngest owner of a block if the block is used by the first snapshot and not used by any snapshot older than the first snapshot, wherein the file server calculates the first number of blocks at a time the first snapshot is created and wherein the storage server updates the first number of blocks if changes are made to the storage system that correspond to the first number of blocks;

storing, by the file server, a second block map associated with the second snapshot, the second block map including a second number of blocks of which the second snapshot is an youngest owner, wherein the second snapshot is the youngest owner of a block if the block is used by the second snapshot and not used by any snapshot older than the second snapshot, wherein the file server calculates the second number of blocks at a time the second snapshot is created and wherein the storage server updates the second number of blocks if changes are made to the storage system that correspond to the second number of blocks;

receiving, by the storage server, a snapshot inquiry command, the snapshot inquiry command received after the creation of the first and second snapshots and after the creation of the first and second block maps;

determining, by the storage server in response to the snapshot inquiry command, a rate of change of data between the first and the second snapshots, wherein the determining the rate of change of data between snapshots includes retrieving the first number of blocks and the second number of blocks from the first and second block maps, dividing a sum of the first number to the second number by a difference between a time of creation for the first and second snapshots; and reporting, by the storage server via a graphical user interface in response to the snapshot inquiry command, how long available storage in the storage system will last based upon the determined rate of change.

4. The method of claim 3, wherein the corresponding changes include snapshot destruction and snapshot restoration.

5. A storage server comprising:

a memory;

a processor coupled to the memory through a bus, wherein the processor executes instructions that cause the processor to create a first and a second snapshot of a storage system;

create a first block map associated with the first snapshot, the first block map including a first number blocks of which the first snapshot is an oldest owner, wherein the first snapshot is the oldest owner of a block if the block is used by the first snapshot and not used by any snapshot older than the first snapshot, wherein the file server calculates the first number of blocks at a time the first snapshot is created and wherein the storage server updates the first number of blocks if changes are made to the storage system that correspond to the first number of blocks;

create a second block map associated with the second snapshot, the second block map including a second number of blocks of which the second snapshot is an oldest owner, wherein the second snapshot is the oldest owner of a block if the block is used by the second snapshot and not used by any snapshot older than the second snapshot, wherein the file server calculates the second number of blocks at a time the second snapshot is created and wherein the storage server updates the second number of blocks if changes are made to the storage system that correspond to the second number of blocks;

receive a snapshot inquiry command, the snapshot inquiry command received after the creation of the first and second snapshots and after the creation of the first and second block maps;

determine, in response to the snapshot inquiry command, a rate of change of data between the first and the second snapshots, wherein the determining the rate of change of data between snapshots includes retrieving the first number of blocks and the second number of blocks from the first and second block maps, and dividing a sum of the first number of blocks and the second number of blocks by a difference between a time of creation for the first and second snapshots; and report, via a graphical user interface in response to the snapshot inquiry command, how long available storage in the storage system will last based upon the determined rate of change.

6. The storage server of claim 5, wherein the corresponding changes include snapshot destruction and snapshot restoration.

7. A storage server comprising:

a memory;

a processor coupled to the memory through a bus, wherein the processor executes instructions that cause the processor to create a first and a second snapshot of a storage system;

store a first block map associated with the first snapshot, the first block map including a first number blocks of which the first snapshot is an youngest owner, wherein the first snapshot is the youngest owner of a block if the block is used by the first snapshot and not used by any snapshot older than the first snapshot, wherein the file server calculates the first number of blocks at a time the first snapshot is created and wherein the storage server updates the first number of blocks if changes are made to the storage system that correspond to the first number of blocks;

store a second block map associated with the second snapshot, the second block map including a second number of blocks of which the second snapshot is an youngest owner, wherein the second snapshot is the youngest owner of a block if the block is used by the second snapshot and not used by any snapshot older than the second snapshot, wherein the file server calculates the second number of blocks at a time the second snapshot is created and wherein the storage server updates the second number of blocks if changes are made to the storage system that correspond to the second number of blocks;

receive a snapshot inquiry command, the snapshot inquiry command received after the creation of the first and second snapshots and after the creation of the first and second block maps;

determine, in response to the snapshot inquiry command, a rate of change of data between the first and the second snapshots, wherein the determining the rate of change of data between snapshots includes retrieving the first number of blocks and the second number of blocks from the first and second block maps, and dividing a sum of the first number to the second number by a difference between a time of creation for the first and second snapshots; and report, via a graphical user interface in response to the snapshot inquiry command, how long available storage in the storage system will last based upon the determined rate of change.

8. The storage server of claim 7, wherein the corresponding changes include snapshot destruction and snapshot restoration.

* * * * *